(12) United States Patent
Zemitis et al.

(10) Patent No.: US 11,236,620 B1
(45) Date of Patent: Feb. 1, 2022

(54) TURBINE BLADE TIP SHROUD SURFACE PROFILES

(71) Applicant: General Electric Company, Schenectady, NY (US)

(72) Inventors: William Scott Zemitis, Simpsonville, SC (US); Michelle Jessica Iduate, Simpsonville, SC (US); James Sutherland Stanley, Greenville, SC (US); Adrian Lional Scott, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/183,644

(22) Filed: Feb. 24, 2021

(51) Int. Cl.
*F01D 5/20* (2006.01)
*F01D 5/14* (2006.01)

(52) U.S. Cl.
CPC ............... *F01D 5/20* (2013.01); *F01D 5/141* (2013.01); *F05D 2220/32* (2013.01); *F05D 2250/70* (2013.01); *F05D 2250/74* (2013.01)

(58) Field of Classification Search
CPC ........ F01D 5/20; F01D 5/141; F05D 2220/32; F05D 2250/70; F05D 2250/74
See application file for complete search history.

(56) References Cited

U.S. PATENT DOCUMENTS

| | | | |
|---|---|---|---|
| 6,491,498 B1 | 12/2002 | Seleski et al. | |
| 6,913,445 B1 | 7/2005 | Beddard et al. | |
| 8,057,186 B2 | 11/2011 | Brittingham | |
| 8,192,166 B2 | 6/2012 | Beeck et al. | |
| 9,322,282 B2 * | 4/2016 | Chouhan | F01D 5/143 |
| 9,828,858 B2 * | 11/2017 | Munoz | F01D 5/141 |
| 10,184,342 B2 | 1/2019 | Zhang et al. | |
| 10,526,899 B2 | 1/2020 | Zemitis et al. | |
| 2008/0145207 A1 | 6/2008 | Mohr et al. | |
| 2009/0053047 A1 * | 2/2009 | Chiurato | F01D 5/225 415/173.1 |
| 2015/0345306 A1 | 12/2015 | Chouhan et al. | |
| 2018/0230816 A1 | 8/2018 | Zemitis et al. | |

* cited by examiner

*Primary Examiner* — Eldon T Brockman
(74) *Attorney, Agent, or Firm* — Charlotte Wilson; Hoffman Warnick LLC

(57) ABSTRACT

Turbine blade tip shroud surface profiles are disclosed. Embodiments of the tip shroud include a pair of opposed, axially extending wings configured to couple to an airfoil at a radially outer end of the airfoil. The tip shroud also includes a tip rail extending radially from the pair of opposed, axially extending wings. Tip shroud surface profiles may be of the downstream and/or upstream side of the tip rail, a leading and/or trailing Z-notch of the tip shroud, and/or downstream and/or upstream side radially outer surfaces of wings of the tip shroud. The surface profiles are stated as shapes having a nominal profile substantially in accordance with at least part of Cartesian coordinate values of X and Y, and perhaps Z and a thickness, set forth in a respective table.

18 Claims, 12 Drawing Sheets

TURBINE BLADE TIP SHROUD SURFACE PROFILES

FIELD OF THE DISCLOSURE

The subject matter disclosed herein relates to turbomachines. More particularly, the subject matter disclosed herein relates to turbine blade tip shroud surface profiles.

BACKGROUND OF THE DISCLOSURE

Some jet aircraft and simple or combined cycle power plant systems employ turbines, or so-called turbomachines, in their configuration and operation. Some of these turbines employ airfoils (e.g., turbine nozzles, blades, airfoils, etc.), which during operation are exposed to fluid flows. These airfoils are configured to aerodynamically interact with the fluid flows and to generate energy from these fluid flows as part of power generation. For example, the airfoils may be used to create thrust, to convert kinetic energy to mechanical energy, and/or to convert thermal energy to mechanical energy. As a result of this interaction and conversion, the aerodynamic characteristics of these airfoils may result in losses in system and turbine operation, performance, thrust, efficiency, and power. In addition, during operation, tip shrouds on the radially outer end of the airfoils interact with stationary components to direct hot gases towards the airfoils. As a result of this interaction and conversion, the aerodynamic characteristics of these tip shrouds may result in losses in system and turbine operation, performance, thrust, efficiency, and power.

BRIEF DESCRIPTION OF THE DISCLOSURE

An aspect of the disclosure includes a turbine blade tip shroud, comprising: a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side; a tip rail extending radially from the pair of opposed, axially extending wings, the tip rail having a downstream side, an upstream side opposing the downstream side, and a forward-most and radially outermost origin, and wherein the upstream side of the tip rail has a shape having a nominal profile substantially in accordance with at least part of Cartesian coordinate values of X, Y set forth in TABLE I and originating at the forward-most and radially outermost origin, wherein the Cartesian coordinate values are non-dimensional values of from 0% to 100% convertible to distances by multiplying the X values by a minimum X-wise extent of the tip rail expressed in units of distance and the Y values by a tip rail axial length expressed in units of distance, and wherein X and Y values are connected by lines to define a tip rail upstream side surface profile.

Another second aspect of the disclosure includes a turbine blade tip shroud, comprising: a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side; a tip rail extending radially from the pair of opposed, axially extending wings, the tip rail having a downstream side, an upstream side opposing the downstream side and a forward-most and radially outermost origin, and wherein the downstream side of the tip rail has a shape having a nominal profile substantially in accordance with at least part of Cartesian coordinate values of X, Y set forth in TABLE II and originating at the forward-most and radially outermost origin, wherein the Cartesian coordinate values are non-dimensional values of from 0% to 100% convertible to distances by multiplying the X values by a minimum X-wise extent of the tip rail expressed in units of distance and the Y values by a tip rail axial length expressed in units of distance, and wherein X and Y values are connected by lines to define a tip rail downstream side surface profile.

An aspect of the disclosure includes a turbine blade tip shroud, comprising: a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side; a tip rail extending radially from the pair of opposed, axially extending wings, the tip rail having a downstream side and an upstream side opposing the downstream side and a forward-most and radially outermost origin; and a leading Z-notch surface having a shape having a nominal profile substantially in accordance with at least part of Cartesian coordinate values of X, Y, Z and thickness values set forth in TABLE III and originating at the forward-most and radially outer-most origin, wherein the Cartesian coordinate values are non-dimensional values of from 0% to 100% convertible to distances by multiplying the values by a tip rail axial length, and wherein X and Y values are joined smoothly with one another to form a leading Z-notch surface profile, wherein the thickness of the leading Z-notch surface profile at each X and Y coordinate value extends radially inwardly from a corresponding Z value.

An aspect of the disclosure includes a turbine blade tip shroud, comprising: a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side; a tip rail extending radially from the pair of opposed, axially extending wings, the tip rail having a downstream side and an upstream side opposing the downstream side and a forward-most and radially outermost origin; and a trailing Z-notch surface having a shape having a nominal profile substantially in accordance with at least part of Cartesian coordinate values of X, Y, Z and thickness values set forth in TABLE IV and originating at the forward-most and radially outer-most origin, wherein the Cartesian coordinate values are non-dimensional values of from 0% to 100% convertible to distances by multiplying the values by a tip rail axial length, and wherein X and Y values are joined smoothly with one another to form a trailing Z-notch surface profile, wherein the thickness of the trailing Z-notch surface profile at each X and Y coordinate value extends radially inwardly from a corresponding Z value.

Another aspect of the disclosure provides a turbine blade tip shroud, comprising: a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side; a tip rail extending radially from the pair of opposed, axially extending wings, the tip rail having a downstream side and an upstream side opposing the downstream side, the tip rail having a forward-most and radially outermost origin; and a radially outer surface of the wing on the downstream side of the tip rail having a shape having a nominal profile substantially in accordance with at least part of Cartesian coordinate values of X, Y, Z set forth in TABLE V and originating at the forward-most and radially outermost origin, wherein the Cartesian coordinate values are non-dimensional values of from 0% to 100% convertible to distances by multiplying the values by a tip rail axial length, and wherein X, Y and Z values are joined smoothly with one another to form a downstream side radial outer surface profile.

Another aspect of the disclosure includes a turbine blade tip shroud, comprising: a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side; a tip rail extending radially from the pair of opposed, axially extending wings, the tip rail having a downstream side and an upstream side opposing the downstream side, the tip rail having a rearward-most and radially outermost origin; and a radially outer surface of the wing on the upstream side of the tip rail having a shape having a nominal profile substantially in accordance with at least part of Cartesian coordinate values of X, Y, Z set forth in TABLE VI and originating at the rearward-most and radially outermost origin, wherein the Cartesian coordinate values are non-dimensional values of from 0% to 100% convertible to distances by multiplying the values by a tip rail axial length, and wherein X, Y and Z values are joined smoothly with one another to form an upstream side radial outer surface profile.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
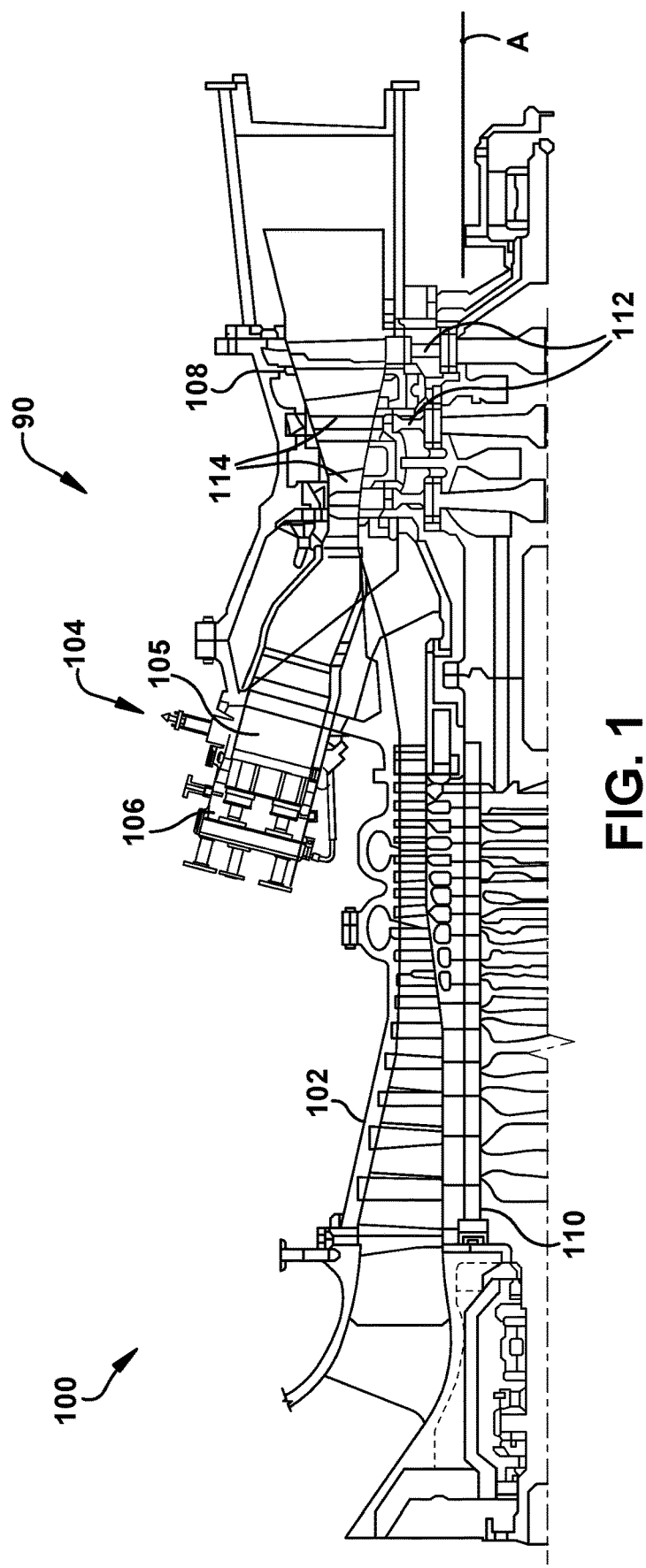
FIG. 1 shows a schematic view of an illustrative turbomachine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION OF THE DISCLOSURE

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis A, e.g., rotor shaft 110. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur and that the description includes instances where the event occurs and instances where it does not.

Where an element or layer is referred to as being "on," "engaged to," "connected to," or "coupled to" another element or layer, it may be directly on, engaged to, connected to or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Various aspects of the disclosure are directed toward surface profiles of a tip shroud of turbine rotor blades that rotate (hereinafter, "blade" or "turbine blade"). Embodiments of the tip shroud include a pair of opposed, axially extending wings configured to couple to an airfoil at a radially outer end of the airfoil. The airfoil has a suction side and a pressure side opposing the suction side, a leading edge spanning between the pressure side and the suction side, and a trailing edge opposing the leading edge and spanning between the pressure side and the suction side. Generally, the pressure side faces upstream, and the suction side faces downstream. The tip shrouds also include a tip rail extending radially from the pair of opposed, axially extending wings. The tip rail has a downstream side, an upstream side opposing the downstream side. The tip rail also includes a forward-most and radially outermost origin that acts as a reference point for the surface profiles, as described herein. Tip shroud surface profiles may be of the downstream and/or upstream side of the tip rail, a leading and/or trailing Z-notch of the tip shroud, and a downstream and/or upstream side radially outer surfaces of wings of the tip shroud.

Figure 4:
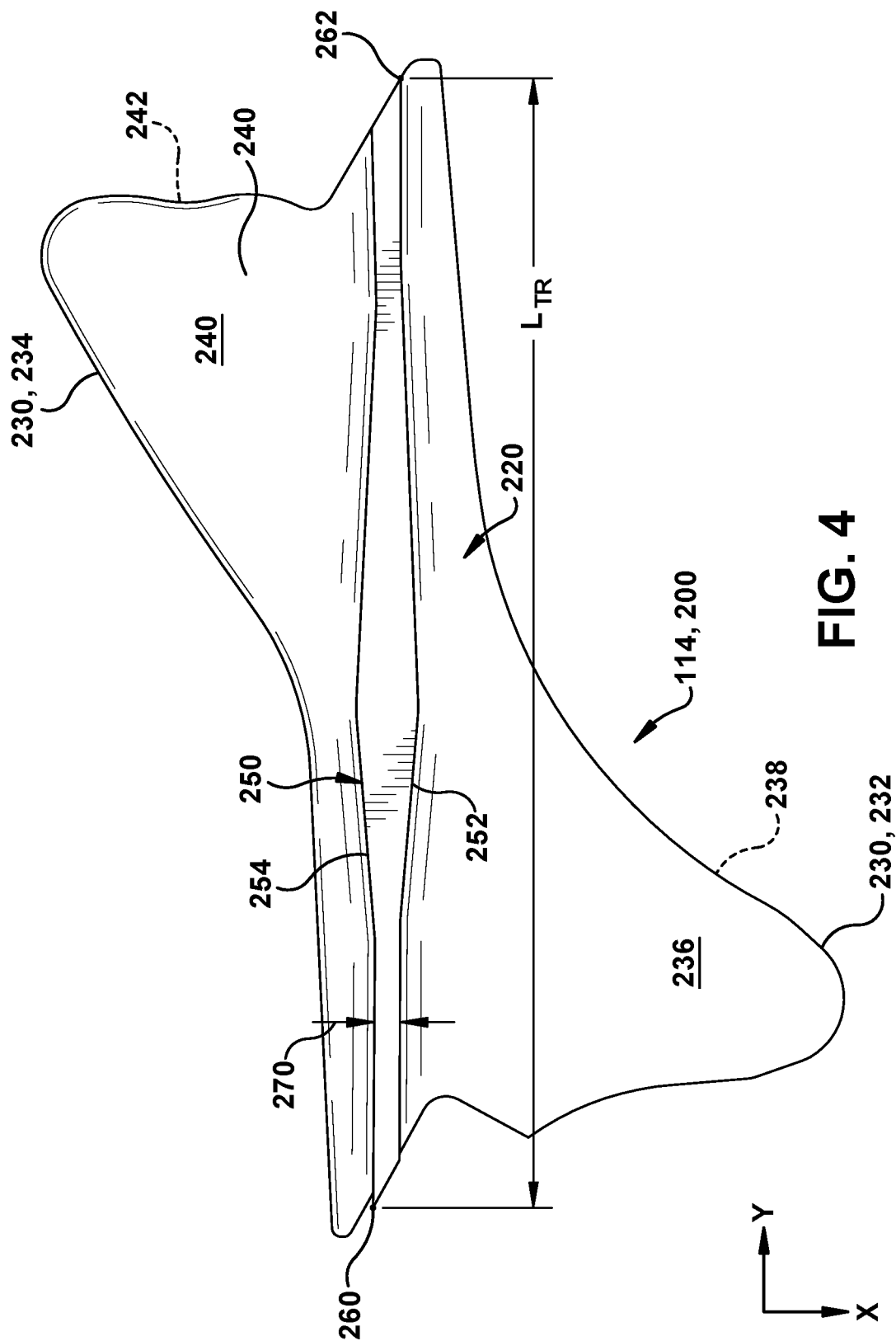
FIG. 4 shows a plan view of a tip shroud, according to various embodiments of the disclosure.

The surface profiles are stated as shapes having a nominal profile substantially in accordance with at least part of Cartesian coordinate values of X and Y, and perhaps Z and a thickness, set forth in a respective table. The Cartesian coordinates originate at the forward-most and radially outermost origin of the tip rail. The Cartesian coordinate values are non-dimensional values of from 0% to 100% convertible to distances by multiplying the values by a particular normalizing parameter value expressed in units of distance. That is, the coordinate values in the tables are values of the normalized parameter, so the multiplication of the actual, desired distance of the normalized parameter times the values presented renders the actual coordinates of the surface profile for a tip shroud having that actual, desired distance of the normalized parameter. As will be described further herein, the normalizing parameter may vary depending on the particular surface profile. For example, for a tip rail surface profile, the normalizing parameter may be: for the X values, a minimum X-wise extent 270 (FIG. 4) of tip rail 250, and for the Y values, a tip rail axial length Lm (FIG. 4). The actual X values of the tip rail surface profile can be rendered by multiplying values in the particular table by the actual, desired X-wise extent of tip rail 250 (e.g., 2.2 centimeters), and the corresponding actual Y values of the tip rail surface profile can be rendered by multiplying values in the particular table by the actual, desired tip rail axial length of tip rail 250 (e.g., 12 centimeters). In any event, the X and Y values, and also Z values where provided, are connected by lines and/or arcs to define smooth surface profiles.

Referring to the drawings, FIG. 1 is a schematic view of an illustrative turbomachine 90 in the form of a combustion turbine or gas turbine (GT) system 100 (hereinafter "GT system 100"). GT system 100 includes a compressor 102 and a combustor 104. Combustor 104 includes a combustion region 105 and a fuel nozzle assembly 106. GT system 100 also includes a turbine 108 and a common rotor compressor/turbine shaft 110 (hereinafter referred to as "rotor shaft 110"). In one non-limiting embodiment, GT system 100 may a 9HA.01 engine, commercially available from General Electric Company, Greenville, S.C. The present disclosure is not limited to any one particular GT system and may be implanted in connection with other engines including, for example, other HA, F, B, LM, GT, TM and E-class engine models of General Electric Company, and engine models of other companies. Further, the teachings of the disclosure are not necessarily applicable to only a GT system and may be applied to other types of turbomachines, e.g., steam turbines, jet engines, compressors, etc.

Figure 2:
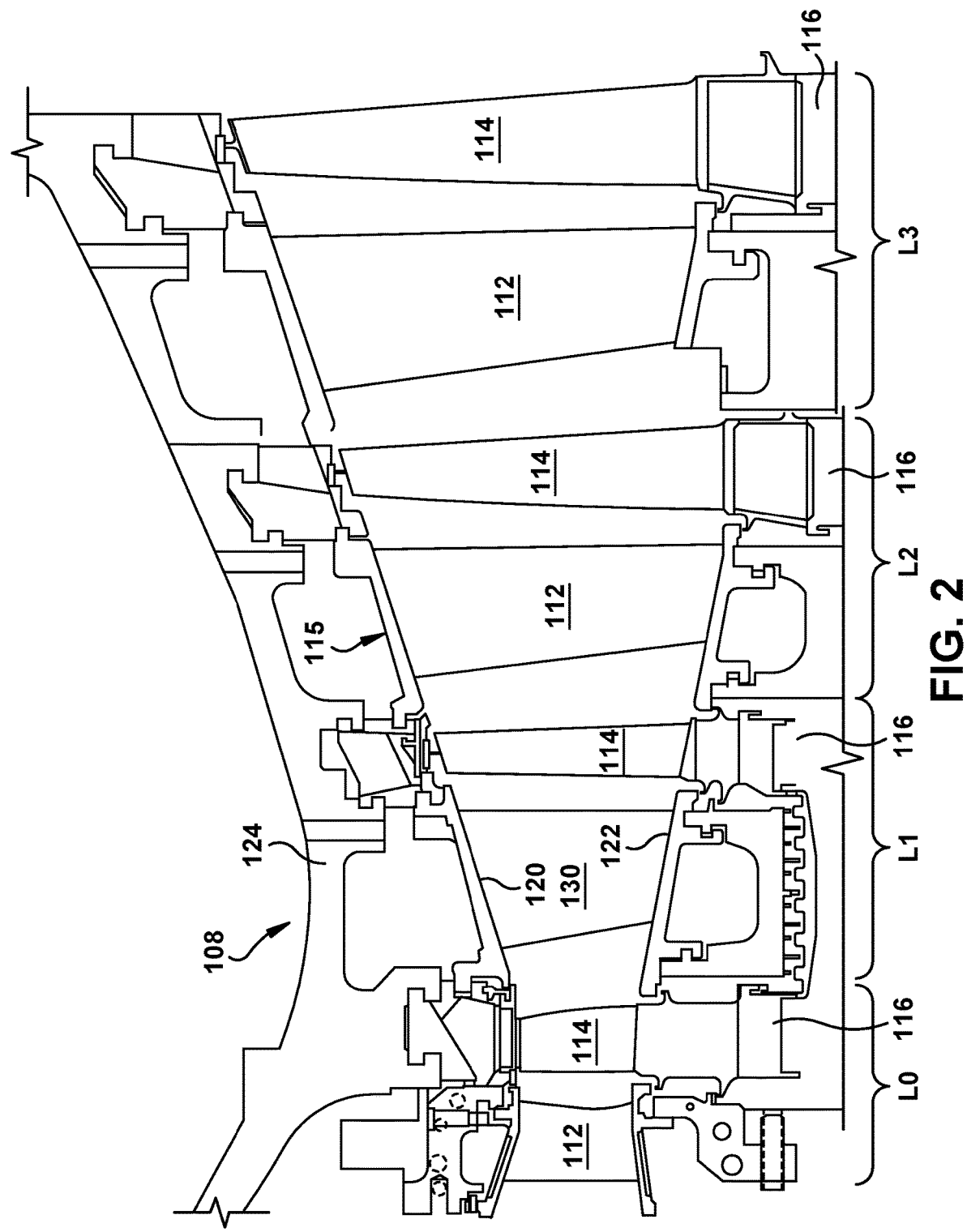
FIG. 2 shows a cross-sectional view of an illustrative gas turbine assembly with four stages that may be used with the turbomachine in FIG. 1.

FIG. 2 shows a cross-section view of an illustrative portion of turbine 108 with four stages L0-L3 that may be used with GT system 100 in FIG. 1. The four stages are referred to as L0, L1, L2, and L3. Stage L0 is the first stage and is the smallest (in a radial direction) of the four stages. Stage L1 is the second stage and is the next stage in an axial direction. Stage L2 is the third stage and is the next stage in an axial direction. Stage L3 is the fourth, last stage and is the largest (in a radial direction). It is to be understood that four stages are shown as one non-limiting example only, and each turbine may have more or less than four stages.

A set of stationary vanes or nozzles 112 cooperate with a set of rotating blades 114 to form each stage L0-L3 of turbine 108 and to define a portion of a flow path through turbine 108. Rotating blades 114 in each set are coupled to a respective rotor wheel 116 that couples them circumferentially to rotor shaft 110. That is, a plurality of rotating blades 114 are mechanically coupled in a circumferentially spaced manner to each rotor wheel 116. A static blade section 115 includes stationary nozzles 112 circumferentially spaced around rotor shaft 110. Each nozzle 112 may include at least one endwall (or platform) 120, 122 connected with airfoil 130. In the example shown, nozzle 112 includes a radially outer endwall 120 and a radially inner endwall 122. Radially outer endwall 120 couples nozzle 112 to a casing 124 of turbine 108.

In operation, air flows through compressor 102, and compressed air is supplied to combustor 104. Specifically, the compressed air is supplied to fuel nozzle assembly 106 that is integral to combustor 104. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 within which gas stream thermal energy is converted to mechanical rotational energy. Turbine 108 is rotatably coupled to and drives rotor shaft 110. Compressor 102 may also be rotatably coupled to rotor shaft 110. In the illustrative embodiment, there is a plurality of combustors 104 and fuel nozzle assemblies 106. In the following discussion, unless otherwise indicated, only one of each component will be discussed. At least one end of rotating rotor shaft 110 may extend axially away from turbine 108 and may be attached to a load or machinery (not shown), such as, but not limited to, a generator, a load compressor, and/or another turbine.

Figure 3:
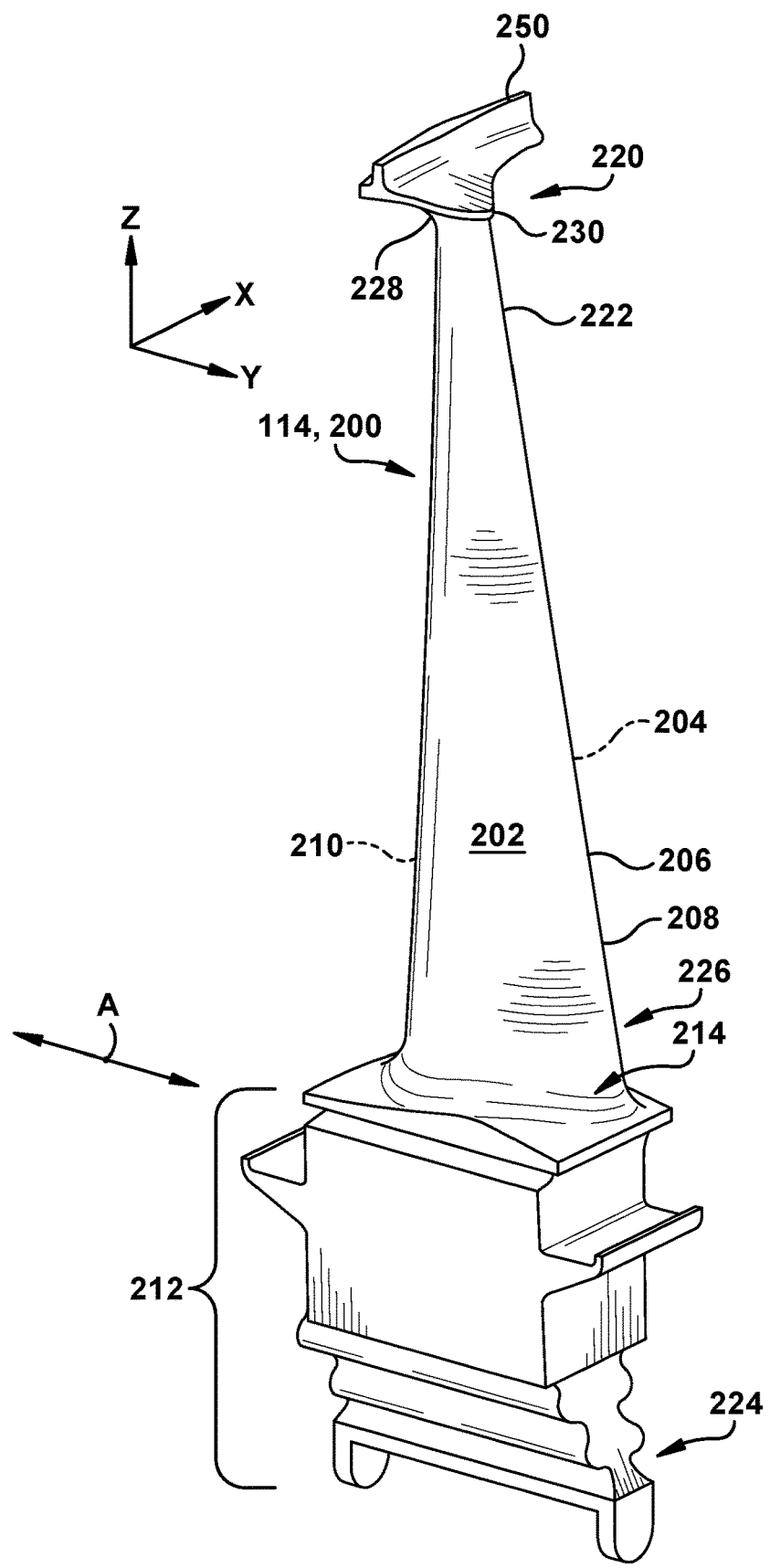
FIG. 3 shows a schematic three-dimensional view of an illustrative turbine blade including a tip shroud on a radial outer end of an airfoil, according to various embodiments of the disclosure.

FIG. 3 shows an enlarged perspective view of an illustrative turbine rotor blade 114 in detail as a blade 200. For purposes of description, a legend may be provided in the drawings in which the X-axis extends generally axially, the Y-axis extends generally perpendicular to axis A of rotor shaft 110 (FIG. 1)(indicating a circumferential plane), and the Z-axis extends radially, relative to an axis A of rotor shaft 110 (FIG. 1). Relative to FIG. 3, the legend's arrowheads' direction show the direction of positive coordinate values. Blade 200 is a rotatable (dynamic) blade, which is part of the set of turbine rotor blades 114 circumferentially dispersed about rotor shaft 110 (FIG. 1) in a stage of a turbine (e.g., turbine 108). That is, during operation of turbine, as a working fluid (e.g., gas or steam) is directed across the blade's airfoil, blade 200 will initiate rotation of a rotor shaft (e.g., rotor shaft 110) and rotate about axis A defined by rotor shaft 110. It is understood that blade 200 is configured to couple (mechanically couple via fasteners, welds, slot/grooves, etc.) with a plurality of similar or distinct blades (e.g., blades 200 or other blades) to form a set of blades in a stage of the turbine. Referring to FIG. 2, in various non-limiting embodiments, blade 200 can include a first stage (L0) blade, second stage (L1) blade, third stage (L2) blade, or fourth stage (L3) blade. In particular embodiments, blade 200 is a fourth stage (L3) blade. In various embodiments, turbine 108 can include a set of blades 200 in only the first stage (L0) of turbine 108, or in only second stage (L3), or in only third stage (L2), or in only fourth stage (L3) of turbine 108.

Returning to FIG. 3, blade 200 can include an airfoil 202 having a pressure side 204 (obstructed in this view) and a suction side 206 opposing pressure side 204. Blade 200 can also include a leading edge 208 spanning between pressure side 204 and suction side 206, and a leading edge 208 opposing a trailing edge 210 and spanning between pressure side 204 and suction side 206. As noted, pressure side 204 of airfoil 202 generally faces upstream, and suction side 206 generally faces downstream.

As shown, blade 200 can also include an endwall 212 connected with airfoil 202 and a turbine blade tip shroud 220 (hereinafter "tip shroud 220") on a radial outer end 222 of airfoil 202. Endwall 212 is illustrated as including a dovetail 224 in FIG. 3, but endwall 212 can have any suitable configuration to connect to rotor shaft 110. Endwall 212 can be connected with airfoil 202 along pressure side 204, suction side 206, leading edge 208 and trailing edge 210. In various embodiments, blade 200 includes a fillet 214 proximate a radially inner end 226 of airfoil 202, fillet 214 connecting airfoil 202 and endwall 212. Fillet 214 can include a weld or braze fillet, which may be formed via conventional MIG welding, TIG welding, brazing, etc. Fillet 214 can include such forms as integral to the investment casting process or definition. Endwall 212 is configured to fit into a mating slot (e.g., dovetail slot) in the turbine rotor shaft (e.g., rotor shaft 110) and to mate with adjacent components of other blades 200. Endwall 212 is intended to be located radially inboard of airfoil 202 and be formed in any complementary configuration to the rotor shaft.

Tip shroud 220 can be connected with airfoil 202 along pressure side 204, suction side 206, leading edge 208 and trailing edge 210. In various embodiments, blade 200 includes a fillet 228 proximate radially outer end 222 of airfoil 202, fillet 228 connecting airfoil 202 and tip shroud 220. Fillet 228 can include a weld or braze fillet, which may be formed via conventional MIG welding, TIG welding, brazing, etc. Fillet 228 can include such forms as integral to the investment casting process or definition. In certain embodiments, fillets 214 and/or fillet 228 can be shaped to enhance aerodynamic efficiencies.

Figure 5:
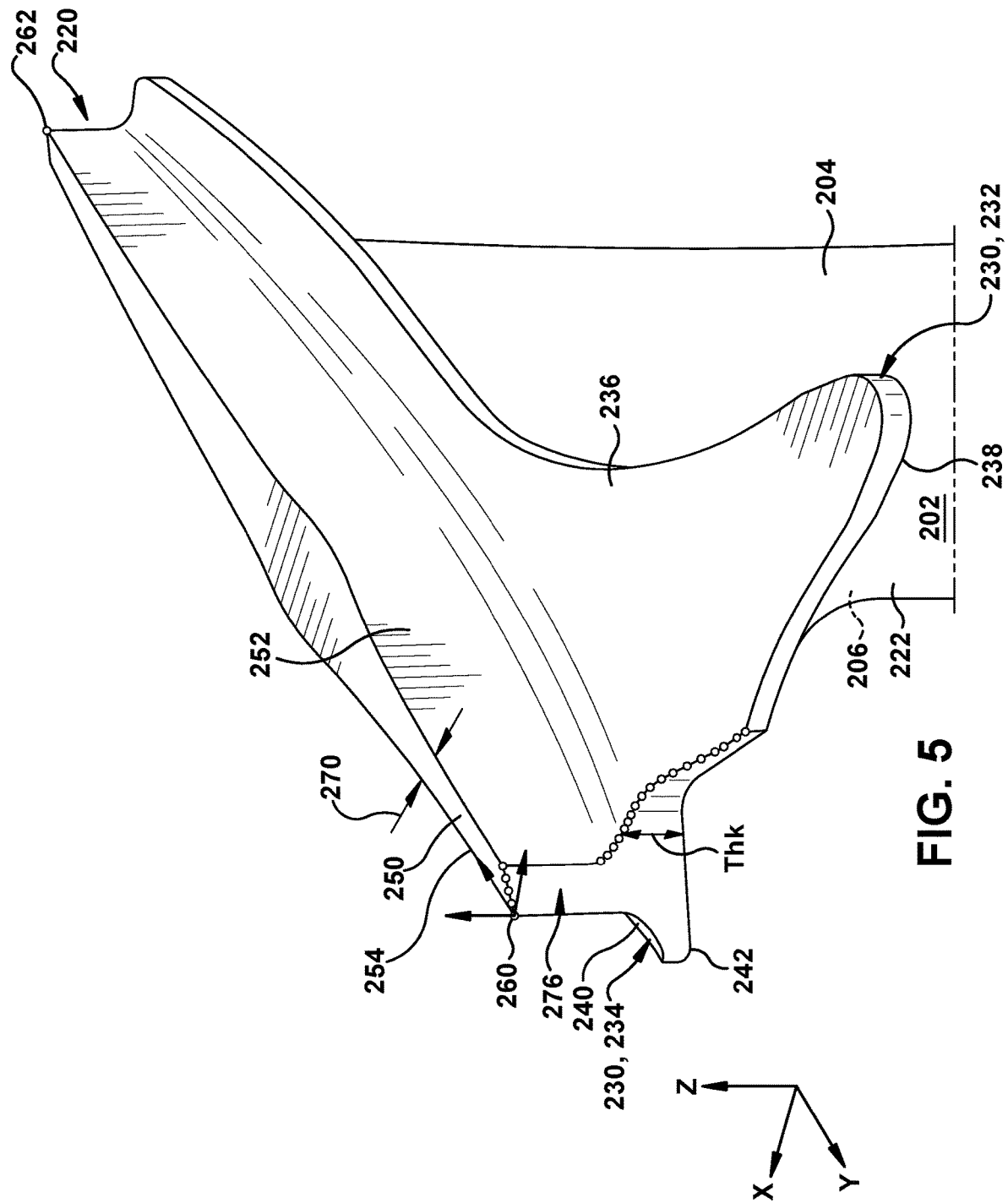
FIG. 5 shows a forward perspective view of a tip shroud including a leading Z-notch surface profile, according to embodiments of the disclosure.

FIG. 4 shows a plan view and FIG. 5 shows a forward perspective view of tip shroud 220. With reference to FIGS. 3-5 collectively, tip shroud 220 may include a pair of opposed, axially extending wings 230 configured to couple to airfoil 202 at radially outer end 222 (FIGS. 3 and 5) of airfoil 202 (e.g., via fillet 228). More particularly, as shown in FIGS. 4 and 5, tip shroud 220 may include an upstream side wing 232 and a downstream side wing 234. Upstream side wing 232 extends generally circumferentially away from a tip rail 250 over pressure side 204 of airfoil 202, and downstream side wing 234 extends generally circumferentially away from tip rail 250 over suction side 206 of airfoil 202. Upstream side wing 232 includes a radial outer surface 236 facing generally radially outward from axis A of rotor shaft 110 (FIG. 1), and a radially inner surface 238 facing generally radially inward toward axis A of rotor shaft 110 (FIG. 1). Similarly, downstream side wing 234 includes a radial outer surface 240 facing generally radially outward from axis A of rotor shaft 110 (FIG. 1), and a radially inner surface 242 facing generally radially inward toward axis A of rotor shaft 110 (FIG. 1).

Tip shroud 220 also includes a tip rail 250 extending radially from pair of opposed, axially extending wings 230. Tip rail 250 has an upstream side 252 and a downstream side 254 opposing upstream side 252. Upstream side 252 of tip rail 250 faces generally circumferentially towards pressure side 204 of airfoil 202 and melds smoothly according to the surface profiles described herein with radial outer surface 236 of upstream side wing 232. Similarly, downstream side 254 of tip rail 250 faces generally circumferentially towards suction side 206 of airfoil 202 and melds smoothly according to the surface profiles described herein with radial outer surface 240 of downstream side wing 234. As shown in FIGS. 4 and 5, tip rail 250 also includes a forward-most and radially outermost origin (point) 260 at an axially forward end thereof, and a rearward-most and radially outermost origin (point) 262 at an axially rearward end thereof. Forward-most and radially outermost origin 260 acts as an origin for certain surface profiles described herein, and rearward-most and radially outermost origin 262 acts as an origin for certain other surface profiles described herein.

FIG. 4 also shows a number of normalization parameters that, as will be described further, may be used to make Cartesian coordinate values for the various surface profiles of tip shroud 220 non-denominational and scalable (and vice versa, make non-denominational Cartesian coordinate values actual coordinate values of a tip shroud). As shown in FIG. 4, a "tip rail axial length ($L_{TR}$)" is a distance between forward-most and radially outermost origin 260 and rearward-most and radially outermost origin 262 running perpendicular to axis A of rotor shaft 110 (FIG. 1), i.e., along the Y-axis. FIG. 4 also shows a "minimum X-wise extent" 270 of tip rail 250 that is a minimum distance between tip rail upstream side 252 and tip rail downstream side 254 extending in the X-direction, i.e., perpendicular to axis A of rotor shaft 110 (FIG. 1) along the X-axis. While shown at a particular location, it is recognized that minimum tip rail X-wise extent 270 can be anywhere along the tip rail axial length that includes upstream side 252 and downstream side 254, i.e., it excludes the angled ends of tip rail 250.

Referring to FIGS. 5-12, various surface profiles of tip shroud 220 according to embodiments of the disclosure will now be described. Data points illustrated in FIGS. 5-12 are schematically represented, and may not match data points in the tables, described hereafter. The surface profiles are each identified in the form of X, Y coordinates, and perhaps also Z coordinates and thickness, listed in a number of tables, i.e., TABLES I, II, III, IV, V, VI. The X, Y, and Z coordinate values and the thickness values in TABLES I-VI have been expressed in normalized or non-dimensionalized form in values of from 0% to 100%, but it should be apparent that any or all of the values could instead be expressed in distance units so long as the percentages and proportions are maintained. To convert X, Y, Z or thickness values of TABLE I-VI to actual respective X, Y or Z coordinate values from the relevant origin (e.g., origin 260 on tip rail 250) and thicknesses, in units of distance, such as inches or meters, the non-dimensional values given in TABLE I-VI can be multiplied by a normalization parameter value. As noted, the normalization parameter may vary depending on the relevant surface profile. In any event, by connecting the X, Y and/or Z values with smooth continuing arcs or lines, depending on the surface profile, each surface profile can be ascertained, thus forming the various nominal tip shroud surface profiles.

The values in TABLES I-VI are non-dimensionalized values generated and shown to three decimal places for determining the various nominal surface profiles of tip shroud 220 at ambient, non-operating, or non-hot conditions, and do not take any coatings into account, though embodiments could account for other conditions and/or coatings. To allow for typical manufacturing tolerances and/or coating thicknesses, ±values can be added to the values listed in TABLE I-VI. For example, a tolerance of about 10-20 percent of a thickness of a Z-notch surface profile in a direction normal to any surface location along the relevant tip shroud radial ouster surface can define a Z-notch thickness range at cold or room temperature. In other words, a distance of about 10-20 percent of a thickness of the relevant Z-notch edge can define a range of variation between measured points on an actual tip shroud surface and ideal positions of those points, particularly at a cold or room temperature, as embodied by the disclosure. The tip shroud configurations, as embodied herein, are robust to this range of variation without impairment of mechanical and aerodynamic functions.

The surface profiles can be scaled larger or smaller, such as geometrically, without impairment of operation. Such scaling can be facilitated by multiplying the normalized/non-dimensionalized values by a common scaling factor (i.e., the actual, desired distance of the normalization parameter), which may be a larger or smaller number of distance units than might have originally been used for a tip shroud, e.g., of a given tip rail axial length or minimum X-wise extent, as appropriate. For example, the non-dimensionalized values in TABLE I, particularly the X and Y values, could be multiplied uniformly by a scaling factor of 2, 0.5, or any other desired scaling factor of the relevant normalized parameter. In various embodiments, the X, Y, and Z distances and Z-notch thicknesses, are scalable as a function of the same constant or number (e.g., tip rail axial length or tip rail minimum X-wise extent, as appropriate) to provide a scaled up or scaled down tip shroud. Alternatively, the values could be multiplied by a larger or smaller desired constant.

While the Cartesian values in TABLE I-VI provide coordinate values at predetermined locations, only a portion of Cartesian coordinate values set forth in each table may be employed. In one non-limiting example, with reference to FIG. 10, radial outer surface 236 of upstream side wing 232 surface profile may use a portion of X, Y, Z coordinate values defined in TABLE V, i.e., from points 1 to 120. Any portion of Cartesian coordinate values of X, Y, Z and thicknesses set forth in TABLES I-VI may be employed.

Figure 6:
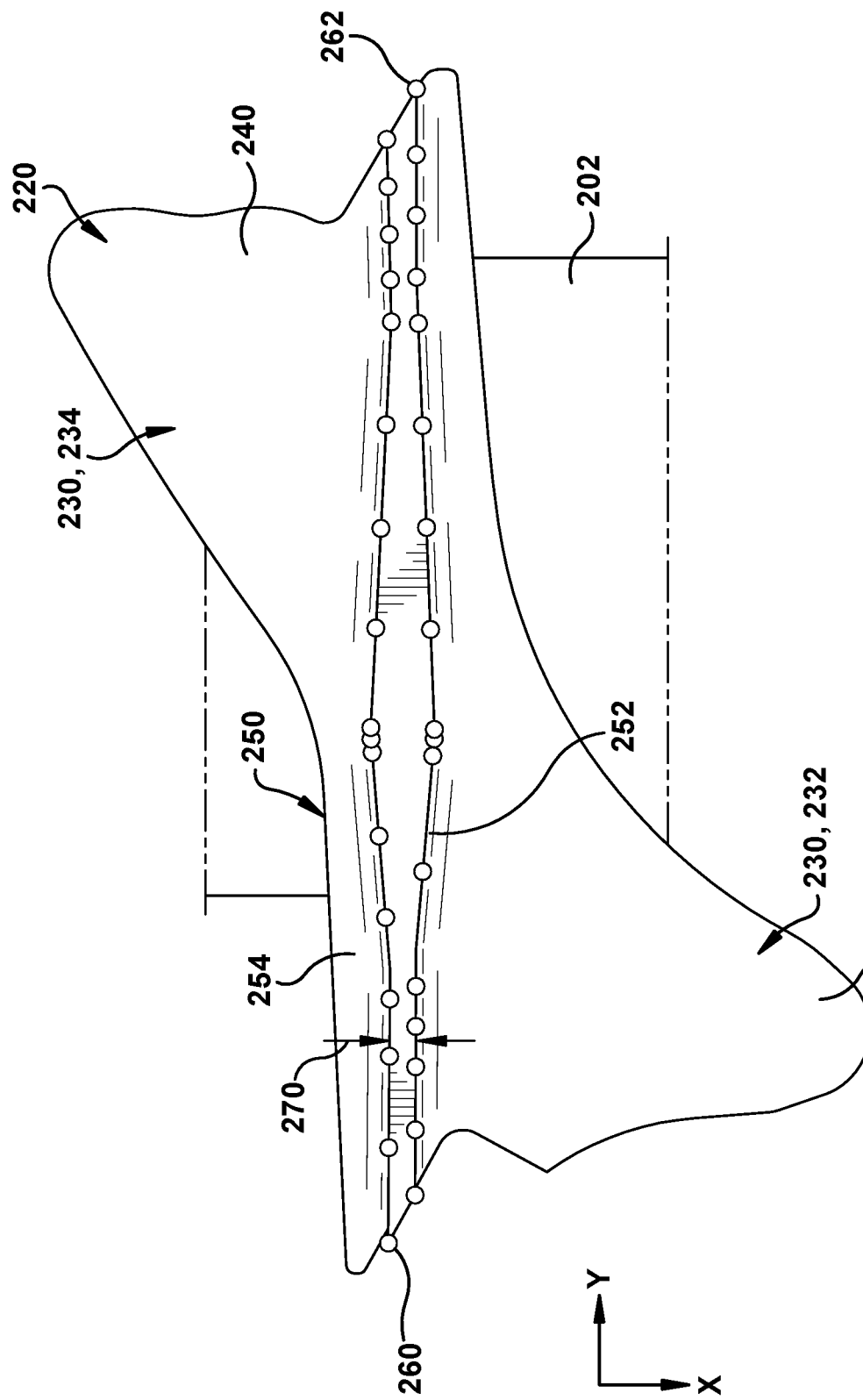
FIG. 6 shows a plan view of a tip shroud including points of tip rail surface profiles, according to various embodiments of the disclosure.

FIG. 6 shows a plan view of tip shroud 220, similar to FIG. 4, but showing a number of X-Y coordinate points that define a tip rail upstream side 252 surface profile, and a tip rail downstream side 254 surface profile.

In one embodiment, upstream side 252 of tip rail 250 has a shape having a nominal profile substantially in accordance with at least part of Cartesian coordinate values of X, Y set forth in TABLE I (below) and originating at forward-most and radially outermost origin 260. The Cartesian coordinate values are non-dimensional values of from 0% to 100% convertible to distances by multiplying: the X values by minimum X-wise extent 270 of tip rail 250 expressed in units of distance, and the Y values by a tip rail axial length $L_{TR}$, expressed in units of distance. That is, the normalization parameter for the X coordinates is a minimum X-wise extent 270 of tip rail 250, and the normalization parameter for the Y coordinates is tip rail axial length $L_{TR}$ of tip rail 250. When scaling up or down, the X coordinate values in TABLE I can be multiplied by the actual, desired X-wise extent 270 (scaling factor) of tip rail 260 to obtain the actual X coordinate values of the tip rail upstream side 252 surface profile, and the Y coordinate values in TABLE I can be multiplied by the desired tip rail axial length $L_{TR}$ of tip rail 250 to identify the corresponding actual Y coordinate values of the tip shroud upstream side 252 surface profile. Collectively, the actual X and Y coordinate values created identify the tip rail downstream side 252 surface profile, according to embodiments of the disclosure, at any desired size of tip shroud. As shown in FIG. 6, X and Y values may be connected by lines to define the tip rail downstream side surface profile.

TABLE I

Tip Rail Upstream Side Surface Profile
[non-dimensionalized values]

| Pt | X | Y |
|---|---|---|
| 1 | 1.000 | 0.040 |
| 2 | 1.000 | 0.095 |

TABLE I-continued

Tip Rail Upstream Side Surface Profile
[non-dimensionalized values]

| Pt | X | Y |
|---|---|---|
| 3 | 1.000 | 0.150 |
| 4 | 1.029 | 0.185 |
| 5 | 1.115 | 0.220 |
| 6 | 1.454 | 0.321 |
| 7 | 1.793 | 0.423 |
| 8 | 1.815 | 0.437 |
| 9 | 1.808 | 0.445 |
| 10 | 1.637 | 0.534 |
| 11 | 1.466 | 0.623 |
| 12 | 1.294 | 0.713 |
| 13 | 1.123 | 0.802 |
| 14 | 1.085 | 0.842 |
| 15 | 1.085 | 0.895 |
| 16 | 1.085 | 0.949 |
| 17 | 1.085 | 1.000 |

In another embodiment, downstream side 254 of tip rail 250 has a shape having a nominal profile substantially in accordance with at least part of Cartesian coordinate values of X, Y set forth in TABLE II (below) and originating at forward-most and radially outermost origin 260. The Cartesian coordinate values are non-dimensional values of from 0% to 100% convertible to distances by multiplying: the X values by minimum X-wise extent 270 of tip rail 250 expressed in units of distance, and the Y values by a tip rail axial length $L_{TR}$, expressed in units of distance. Here again, the normalization parameter for the X coordinates is minimum X-wise extent 270 of tip rail 250, and the normalization parameter for the Y coordinates is tip rail axial length Lm of tip rail 250. When scaling up or down, the X coordinate values in TABLE II can be multiplied by the actual, desired X-wise extent 270 (scaling factor) of tip rail 260 to obtain the actual X coordinate values of the tip rail downstream side 254 surface profile, and the Y coordinate values in TABLE I can be multiplied by the desired tip rail axial length Lm (scaling factor) of tip rail 250 to identify the corresponding actual Y coordinate values of the tip shroud downstream side 254 surface profile. Collectively, the actual X and Y coordinate values created identify the tip rail downstream side 254 surface profile, according to embodiments of the disclosure, at any desired size of tip shroud. As shown in FIG. 6, X and Y values may be connected by lines to define the tip rail downstream side 254 surface profile.

TABLE II

Tip Rail Downstream Side Surface Profile
[non-dimensionalized values]

| Pt | X | Y |
|---|---|---|
| 1 | 0.000 | 0.000 |
| 2 | 0.000 | 0.080 |
| 3 | 0.000 | 0.159 |
| 4 | −0.057 | 0.208 |
| 5 | −0.226 | 0.280 |
| 6 | −0.394 | 0.352 |
| 7 | −0.563 | 0.424 |
| 8 | −0.577 | 0.436 |
| 9 | −0.569 | 0.445 |
| 10 | −0.414 | 0.535 |
| 11 | −0.258 | 0.624 |
| 12 | −0.103 | 0.714 |
| 13 | 0.053 | 0.803 |
| 14 | 0.085 | 0.839 |
| 15 | 0.085 | 0.880 |

TABLE II-continued

Tip Rail Downstream Side Surface Profile
[non-dimensionalized values]

| Pt | X | Y |
|---|---|---|
| 16 | 0.085 | 0.921 |
| 17 | 0.085 | 0.962 |

In another embodiment, tip shroud 220 may also include both upstream and downstream tip rail surface profiles, as described herein relative to TABLES I and II.

Figure 7:
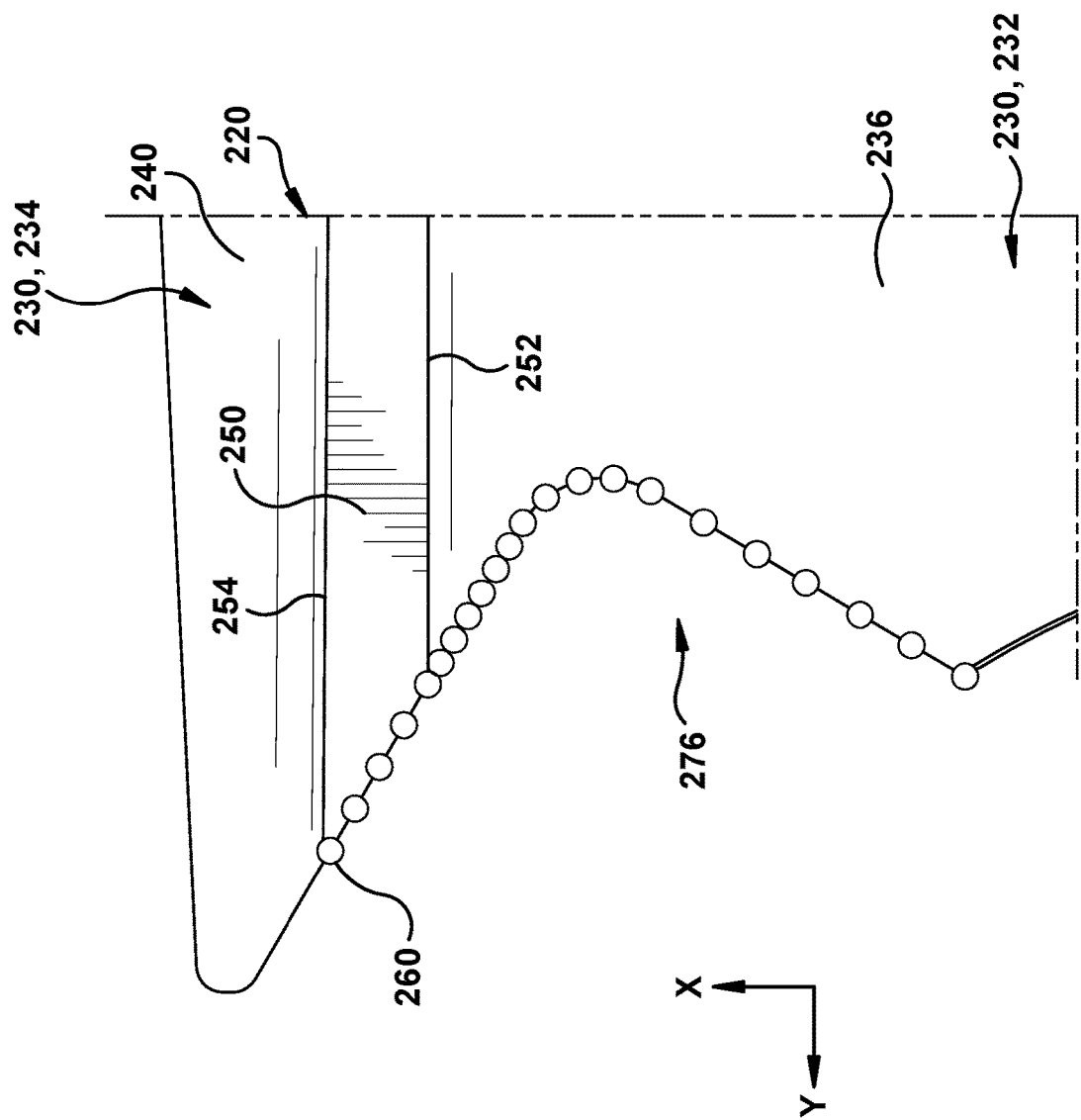
FIG. 7 shows a partial plan view of a tip shroud including points of a leading Z-notch surface profile, according to various embodiments of the disclosure.
Figure 8:
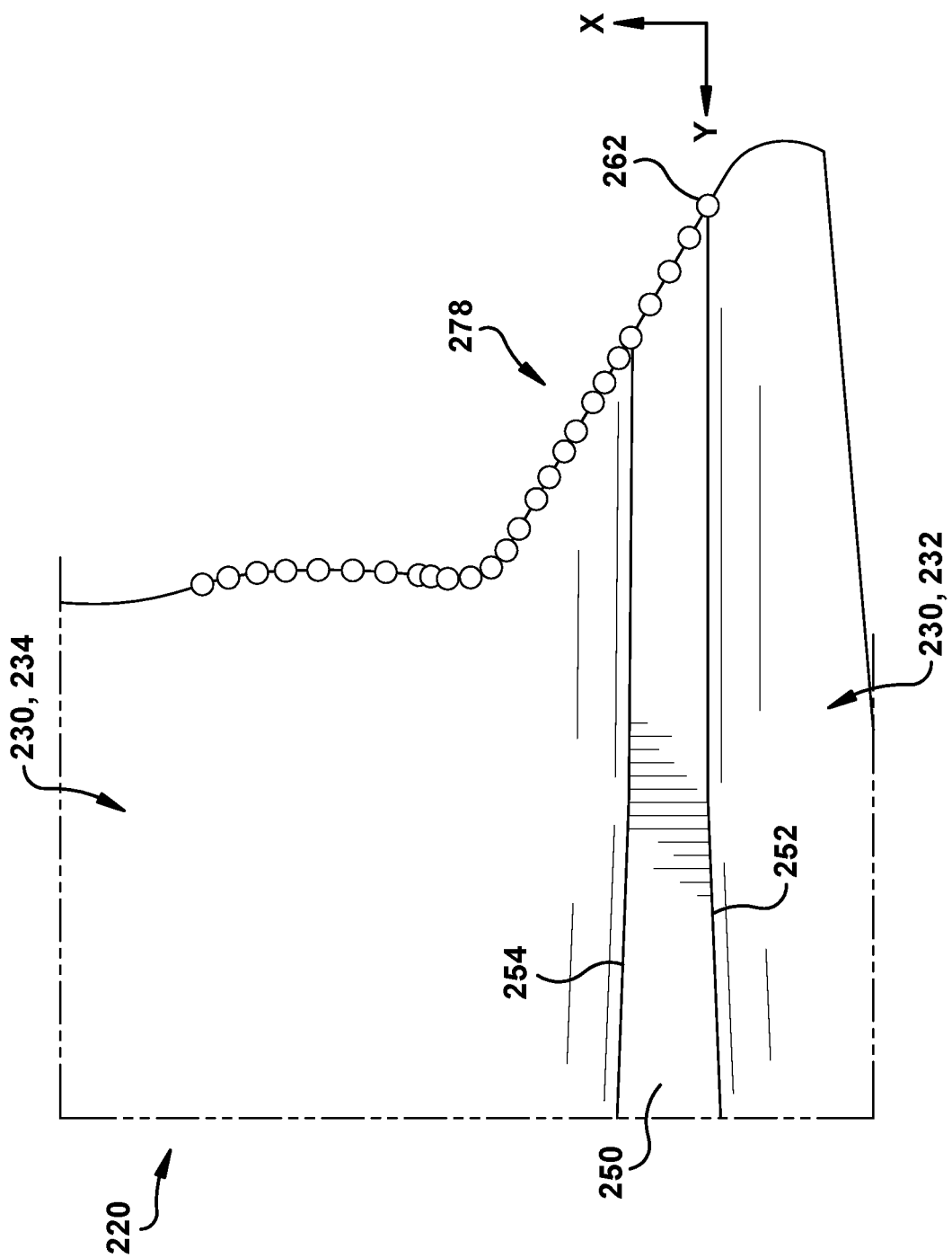
FIG. 8 shows a partial plan view of a tip shroud including points of a trailing Z-notch surface profile, according to various embodiments of the disclosure.
Figure 9:
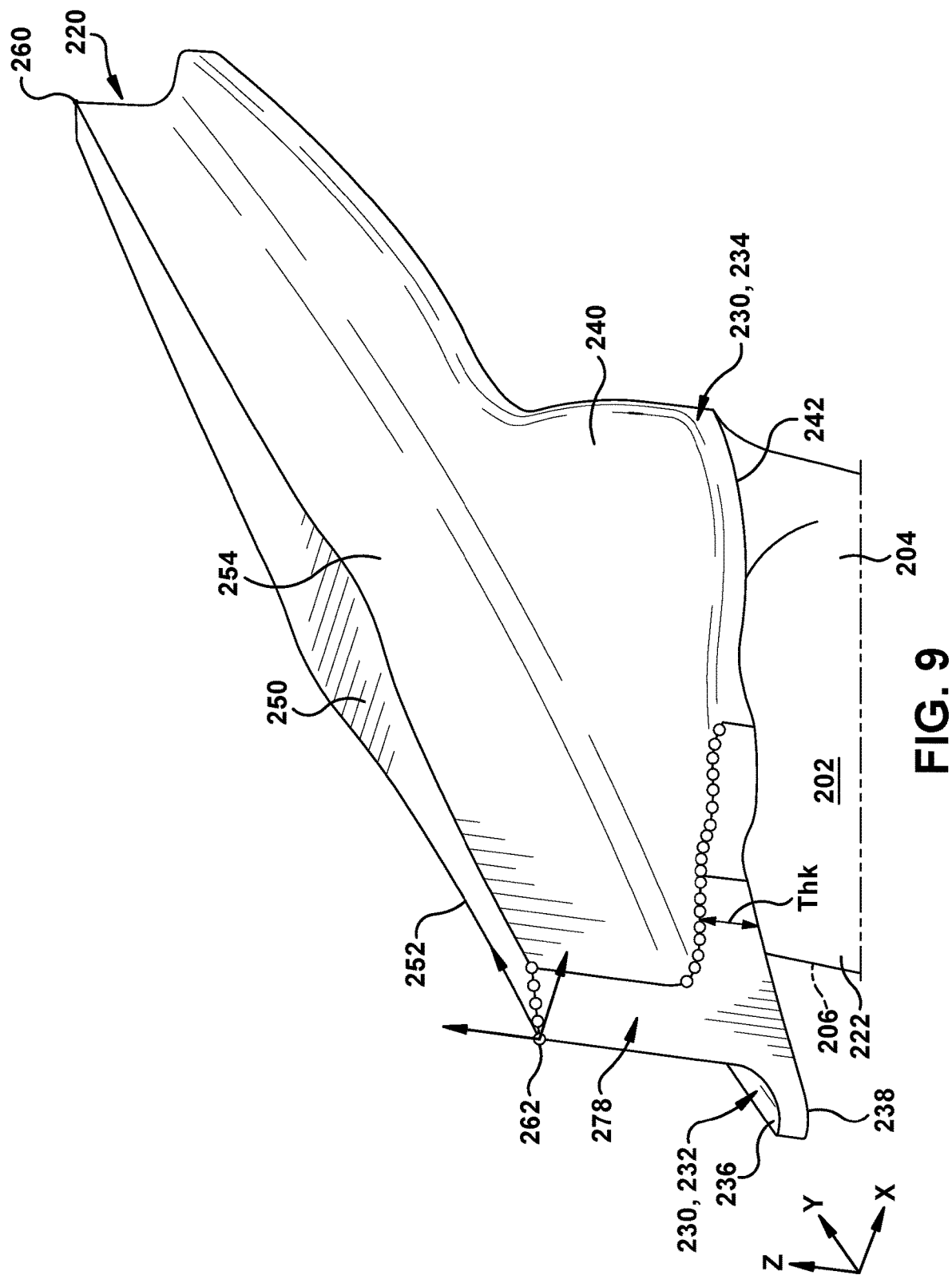
FIG. 9 shows an aft perspective view of a tip shroud including points of a trailing Z-notch surface profile, according to embodiments of the disclosure.

FIG. 7 shows a partial plan view of tip shroud 220 at a leading Z-notch surface 276, and FIG. 8 shows a partial plan view of tip shroud 220 at a trailing Z-notch surface 278. As understood in the field, Z-notch surfaces 276, 278 of adjacent tip shrouds 220 on adjacent blades 200 (FIG. 3) mate to collectively define a radially inner surface for a hot gas path in turbine 108 (FIG. 1), e.g., via wings 230. FIG. 5 shows a forward perspective view of leading Z-notch surface 276, and FIG. 9 shows an aft perspective view of trailing Z-notch surface 278. Each Z-notch surface 276, 278 has a thickness or radial extent Thk that varies along its length, and which can be part of a Z-notch surface profile, according to embodiments of the disclosure.

Leading Z-notch surface 276 (FIGS. 5 and 7) can have a shape having a nominal profile substantially in accordance with at least part of Cartesian coordinate values of X, Y, Z and thickness (Thk) values set forth in TABLE III (below) and originating at forward-most and radially outermost origin 260. The Cartesian coordinate (and thickness) values are non-dimensional values of from 0% to 100% convertible to distances by multiplying the values by tip rail axial length $L_{TR}$ (FIG. 4). That is, the normalization parameter for the X, Y and Z coordinates and the thickness (Thk) are the same: tip rail axial length ($L_{TR}$) of tip rail 250. When scaling up or down, the X, Y, Z coordinate and thickness (Thk) values in TABLE III can be multiplied by the actual, desired tip rail axial length ($L_{TR}$) of tip rail 250 to identify the corresponding actual X, Y, Z coordinate and/or thickness (Thk) values of the leading Z-notch surface profile. The stated thickness (Thk) of leading Z-notch surface profile at each X and Y coordinate value extends radially inwardly from a corresponding Z value. That is, the Z coordinate values are those of a radially outer wing surface 236 of upstream wing 232 from which thickness (Thk) extends radially inward (down on page). The actual X and Y coordinate values can be joined smoothly with one another to form the leading Z-notch surface profile.

TABLE III

Leading Z-notch Surface Profile
[non-dimensionalized values]

| Pt | X | Y | Z | Thk |
|---|---|---|---|---|
| 1 | −0.153 | −0.116 | −0.101 | 0.019 |
| 2 | −0.145 | −0.114 | −0.100 | 0.025 |
| 3 | −0.137 | −0.113 | −0.100 | 0.026 |
| 4 | −0.128 | −0.112 | −0.102 | 0.028 |
| 5 | −0.118 | −0.111 | −0.105 | 0.028 |
| 6 | −0.108 | −0.111 | −0.109 | 0.028 |
| 7 | −0.098 | −0.112 | −0.113 | 0.027 |
| 8 | −0.088 | −0.113 | −0.116 | 0.025 |
| 9 | −0.084 | −0.114 | −0.116 | 0.024 |
| 10 | −0.078 | −0.114 | −0.117 | 0.024 |
| 11 | −0.072 | −0.113 | −0.117 | 0.024 |
| 12 | −0.066 | −0.110 | −0.117 | 0.025 |

TABLE III-continued

Leading Z-notch Surface Profile
[non-dimensionalized values]

| Pt | X | Y | Z | Thk |
|---|---|---|---|---|
| 13 | −0.061 | −0.104 | −0.116 | 0.026 |
| 14 | −0.056 | −0.096 | −0.115 | 0.027 |
| 15 | −0.052 | −0.089 | −0.114 | 0.028 |
| 16 | −0.048 | −0.082 | −0.112 | 0.031 |
| 17 | −0.043 | −0.074 | −0.111 | 0.034 |
| 18 | −0.039 | −0.067 | −0.109 | 0.037 |
| 19 | −0.035 | −0.060 | −0.108 | 0.042 |
| 20 | −0.031 | −0.053 | −0.105 | 0.047 |
| 21 | −0.027 | −0.046 | −0.101 | 0.051 |
| 22 | −0.025 | −0.043 | −0.096 | 0.061 |
| 23 | −0.023 | −0.040 | 0.000 | 0.157 |
| 24 | −0.018 | −0.030 | 0.000 | 0.159 |
| 25 | −0.012 | −0.020 | 0.000 | 0.160 |
| 26 | −0.006 | −0.010 | 0.000 | 0.162 |
| 27 | 0.000 | 0.000 | 0.000 | 0.164 |

Trailing Z-notch surface 278 (FIG. 9) can have a shape having a nominal profile substantially in accordance with at least part of Cartesian coordinate values of X, Y, Z and thickness (Thk) values set forth in TABLE IV (below) and originating at rearward-most and radially outermost origin 262. The Cartesian coordinate (and thickness) values are non-dimensional values of from 0% to 100% convertible to distances by multiplying the values by tip rail axial length ($L_{TR}$). That is, the normalization parameter for the X, Y and Z coordinates and the thickness (Thk) are the same, tip rail axial length ($L_{TR}$) of tip rail 250. When scaling up or down, the X, Y, Z coordinate and thickness (Thk) values in TABLE IV can be multiplied by the actual, desired tip rail axial length ($L_{TR}$) of tip rail 250 to identify the corresponding actual X, Y, Z coordinate and/or thickness (Thk) values of the trailing Z-notch surface profile. The stated thickness (Thk) of trailing Z-notch surface profile at each X and Y coordinate value extends radially inwardly from a corresponding Z value. That is, the Z coordinate values are those of a radially outer wing surface 240 of downstream wing 234 from which thickness (Thk) extends radially inward (down on page). The actual X and Y coordinate values can be joined smoothly with one another to form the leading Z-notch surface profile.

TABLE IV

Trailing Side Z-notch Surface Profile
[non-dimensionalized values]

| Pt | X | Y | Z | Thk |
|---|---|---|---|---|
| 1 | 0.000 | 0.000 | 0.000 | 0.154 |
| 2 | 0.006 | 0.010 | 0.001 | 0.157 |
| 3 | 0.012 | 0.020 | 0.001 | 0.159 |
| 4 | 0.018 | 0.030 | 0.002 | 0.161 |
| 5 | 0.023 | 0.039 | −0.078 | 0.164 |
| 6 | 0.028 | 0.048 | −0.091 | 0.075 |
| 7 | 0.032 | 0.055 | −0.099 | 0.070 |
| 8 | 0.036 | 0.061 | −0.106 | 0.065 |
| 9 | 0.040 | 0.069 | −0.112 | 0.059 |
| 10 | 0.044 | 0.076 | −0.118 | 0.054 |
| 11 | 0.047 | 0.079 | −0.121 | 0.050 |
| 12 | 0.050 | 0.082 | −0.124 | 0.046 |
| 13 | 0.057 | 0.087 | −0.131 | 0.041 |
| 14 | 0.065 | 0.088 | −0.137 | 0.037 |
| 15 | 0.075 | 0.085 | −0.144 | 0.033 |
| 16 | 0.089 | 0.077 | −0.153 | 0.030 |
| 17 | 0.103 | 0.070 | −0.162 | 0.026 |
| 18 | 0.116 | 0.063 | −0.170 | 0.022 |
| 19 | 0.123 | 0.059 | −0.174 | 0.019 |

TABLE IV-continued

Trailing Side Z-notch Surface Profile
[non-dimensionalized values]

| Pt | X | Y | Z | Thk |
|---|---|---|---|---|
| 20 | 0.135 | 0.052 | −0.181 | 0.018 |
| 21 | 0.148 | 0.045 | −0.185 | 0.018 |

In another embodiment, tip shroud 220 may also include both leading and trailing Z-notch surface profiles, as described herein relative to TABLES III and IV.

Figure 10:
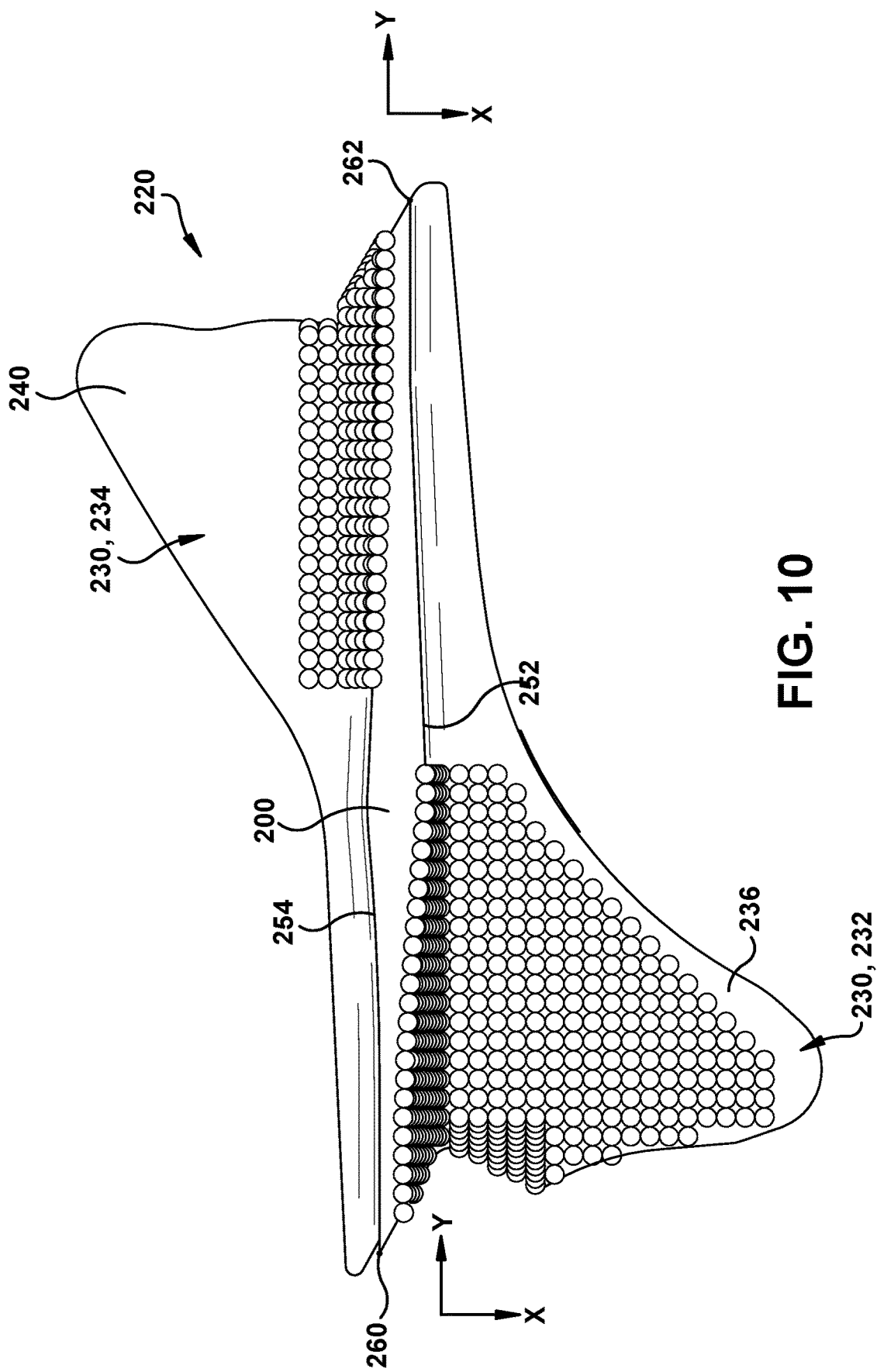
FIG. 10 shows a plan view of a tip shroud including points of radially outer wing surface profiles, according to various embodiments of the disclosure.
Figure 11:
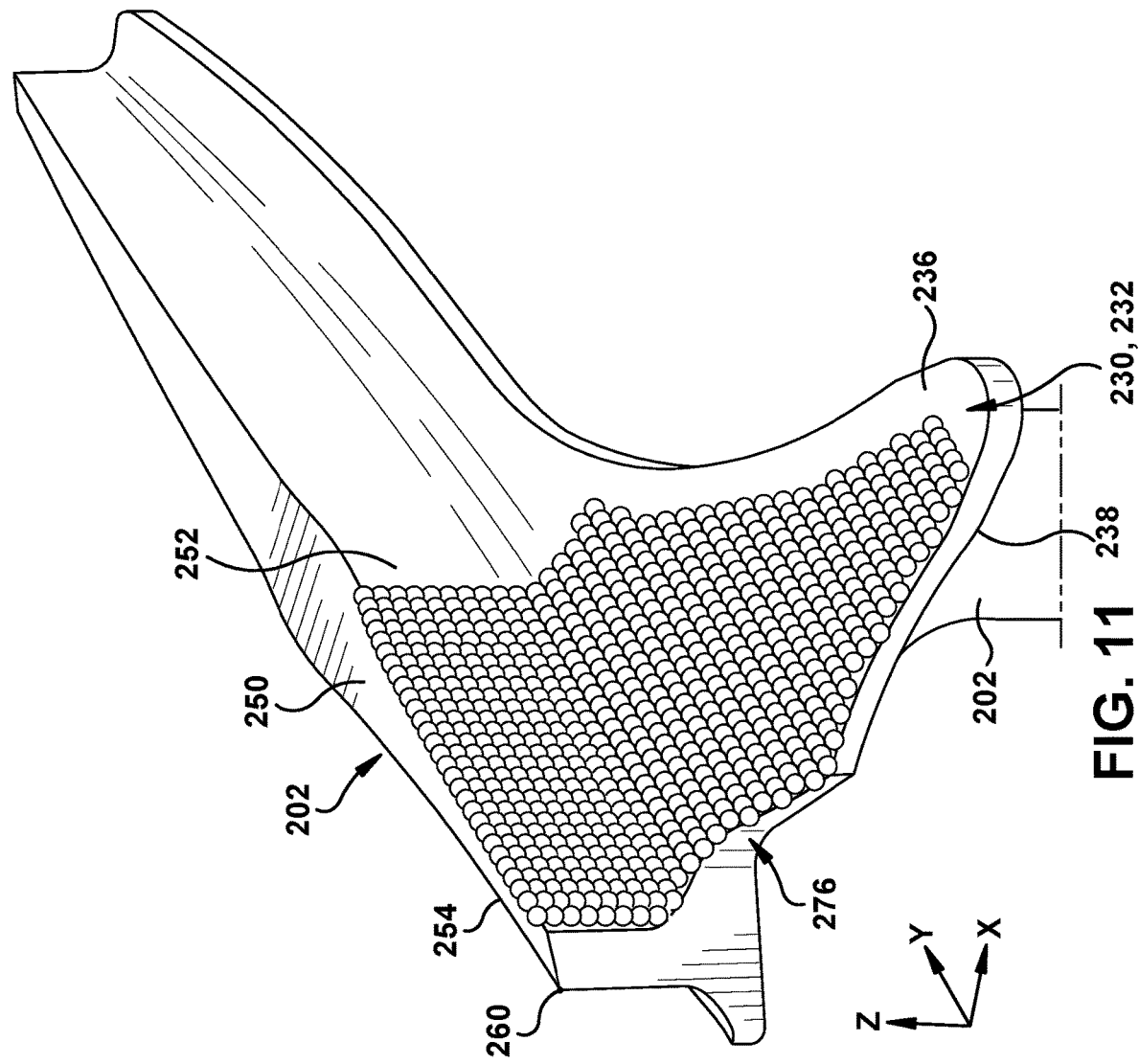
FIG. 11 shows a forward perspective view of a tip shroud including points of an upstream radially outer wing surface profile, according to various embodiments of the disclosure.
Figure 12:
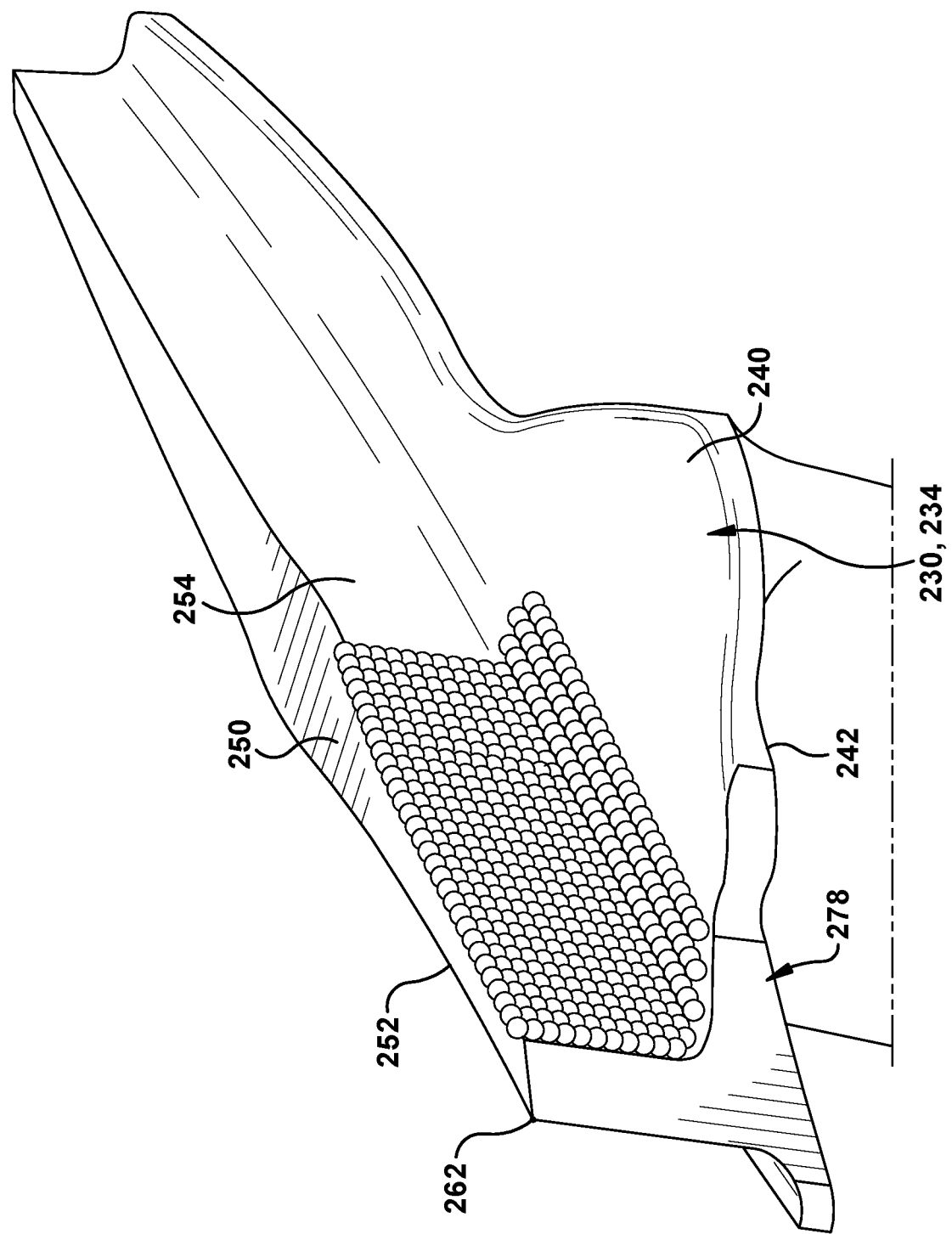
FIG. 12 shows an aft perspective view of a tip shroud including points of a downstream radially outer wing surface profile, according to various embodiments of the disclosure.

FIG. 10 shows a plan view of a tip shroud 220 including a number of points defining at least a portion of radial outer surface 236 of upstream wing 232 of tip shroud 220, and a number of point defining at least a portion of radial outer surface 240 of downstream wing 234 of tip shroud 220. FIG. 11 shows a forward perspective view of upstream radial outer surface 236 of upstream wing 232, and FIG. 12 shows an aft perspective view of downstream radial outer surface 240 of downstream wing 234.

A radially outer surface 236 of wing 232 on the upstream side of tip rail 220 may have a shape having a nominal profile substantially in accordance with at least part of Cartesian coordinate values of X, Y, Z set forth in TABLE V (below) and originating at forward-most and radially outermost origin 260. The Cartesian coordinate values are non-dimensional values of from 0% to 100% convertible to distances by multiplying the values by a tip rail axial length ($L_{TR}$). That is, the normalization parameter for the X, Y and Z coordinates are the same, tip rail axial length ($L_{TR}$) of tip rail 250. When scaling up or down, the X, Y, Z coordinate values in TABLE V can be multiplied by the actual, desired tip rail axial length ($L_{TR}$) of tip rail 250 to identify the corresponding actual X, Y, Z coordinate values of the upstream side radial outer surface 236 profile. The actual X, Y and Z coordinate values can be joined smoothly with one another to form the upstream side radial outer surface 236 profile.

TABLE V

Upstream Side Wing Radial Outer Surface Profile
[non-dimensionalized values]

| PT | X | Y | Z |
|---|---|---|---|
| 1 | 0.023 | 0.048 | −0.074 |
| 2 | 0.023 | 0.057 | −0.074 |
| 3 | 0.023 | 0.066 | −0.074 |
| 4 | 0.023 | 0.075 | −0.073 |
| 5 | 0.023 | 0.084 | −0.073 |
| 6 | 0.023 | 0.093 | −0.073 |
| 7 | 0.023 | 0.102 | −0.072 |
| 8 | 0.023 | 0.111 | −0.072 |
| 9 | 0.023 | 0.120 | −0.072 |
| 10 | 0.023 | 0.129 | −0.071 |
| 11 | 0.023 | 0.147 | −0.071 |
| 12 | 0.023 | 0.165 | −0.071 |
| 13 | 0.028 | 0.057 | −0.092 |
| 14 | 0.028 | 0.066 | −0.092 |
| 15 | 0.028 | 0.075 | −0.092 |
| 16 | 0.028 | 0.084 | −0.092 |
| 17 | 0.028 | 0.093 | −0.093 |
| 18 | 0.028 | 0.102 | −0.094 |
| 19 | 0.028 | 0.111 | −0.094 |
| 20 | 0.028 | 0.120 | −0.094 |
| 21 | 0.028 | 0.129 | −0.094 |
| 22 | 0.028 | 0.147 | −0.094 |
| 23 | 0.028 | 0.165 | −0.093 |
| 24 | 0.028 | 0.183 | −0.092 |
| 25 | 0.028 | 0.201 | −0.091 |

TABLE V-continued

Upstream Side Wing Radial Outer Surface Profile
[non-dimensionalized values]

| PT | X | Y | Z |
|---|---|---|---|
| 26 | 0.028 | 0.219 | −0.088 |
| 27 | 0.028 | 0.237 | −0.082 |
| 28 | 0.032 | 0.066 | −0.100 |
| 29 | 0.032 | 0.075 | −0.100 |
| 30 | 0.032 | 0.084 | −0.101 |
| 31 | 0.032 | 0.093 | −0.102 |
| 32 | 0.032 | 0.102 | −0.103 |
| 33 | 0.032 | 0.111 | −0.103 |
| 34 | 0.032 | 0.120 | −0.104 |
| 35 | 0.032 | 0.129 | −0.104 |
| 36 | 0.032 | 0.147 | −0.103 |
| 37 | 0.032 | 0.165 | −0.103 |
| 38 | 0.032 | 0.183 | −0.102 |
| 39 | 0.032 | 0.201 | −0.101 |
| 40 | 0.032 | 0.219 | −0.098 |
| 41 | 0.032 | 0.237 | −0.096 |
| 42 | 0.032 | 0.255 | −0.095 |
| 43 | 0.032 | 0.273 | −0.094 |
| 44 | 0.032 | 0.291 | −0.094 |
| 45 | 0.032 | 0.309 | −0.089 |
| 46 | 0.037 | 0.075 | −0.107 |
| 47 | 0.037 | 0.084 | −0.108 |
| 48 | 0.037 | 0.093 | −0.109 |
| 49 | 0.037 | 0.102 | −0.110 |
| 50 | 0.037 | 0.111 | −0.111 |
| 51 | 0.037 | 0.120 | −0.111 |
| 52 | 0.037 | 0.129 | −0.111 |
| 53 | 0.037 | 0.147 | −0.112 |
| 54 | 0.037 | 0.165 | −0.111 |
| 55 | 0.037 | 0.183 | −0.112 |
| 56 | 0.037 | 0.201 | −0.111 |
| 57 | 0.037 | 0.219 | −0.111 |
| 58 | 0.037 | 0.237 | −0.109 |
| 59 | 0.037 | 0.255 | −0.107 |
| 60 | 0.037 | 0.273 | −0.107 |
| 61 | 0.037 | 0.291 | −0.108 |
| 62 | 0.037 | 0.309 | −0.105 |
| 63 | 0.037 | 0.327 | −0.099 |
| 64 | 0.037 | 0.345 | −0.091 |
| 65 | 0.037 | 0.363 | −0.083 |
| 66 | 0.041 | 0.084 | −0.114 |
| 67 | 0.041 | 0.093 | −0.115 |
| 68 | 0.041 | 0.102 | −0.116 |
| 69 | 0.041 | 0.111 | −0.117 |
| 70 | 0.041 | 0.120 | −0.117 |
| 71 | 0.041 | 0.129 | −0.118 |
| 72 | 0.041 | 0.147 | −0.118 |
| 73 | 0.041 | 0.165 | −0.119 |
| 74 | 0.041 | 0.183 | −0.119 |
| 75 | 0.041 | 0.201 | −0.120 |
| 76 | 0.041 | 0.219 | −0.119 |
| 77 | 0.041 | 0.237 | −0.118 |
| 78 | 0.041 | 0.255 | −0.116 |
| 79 | 0.041 | 0.273 | −0.115 |
| 80 | 0.041 | 0.291 | −0.115 |
| 81 | 0.041 | 0.309 | −0.112 |
| 82 | 0.041 | 0.327 | −0.108 |
| 83 | 0.041 | 0.345 | −0.103 |
| 84 | 0.041 | 0.363 | −0.100 |
| 85 | 0.041 | 0.381 | −0.099 |
| 86 | 0.041 | 0.399 | −0.099 |
| 87 | 0.041 | 0.417 | −0.095 |
| 88 | 0.041 | 0.435 | −0.096 |
| 89 | 0.041 | 0.453 | −0.098 |
| 90 | 0.046 | 0.093 | −0.120 |
| 91 | 0.046 | 0.102 | −0.121 |
| 92 | 0.046 | 0.111 | −0.122 |
| 93 | 0.046 | 0.120 | −0.123 |
| 94 | 0.046 | 0.129 | −0.123 |
| 95 | 0.046 | 0.147 | −0.124 |
| 96 | 0.046 | 0.165 | −0.124 |
| 97 | 0.046 | 0.183 | −0.125 |
| 98 | 0.046 | 0.201 | −0.131 |
| 99 | 0.046 | 0.219 | −0.125 |
| 100 | 0.046 | 0.237 | −0.124 |
| 101 | 0.046 | 0.255 | −0.122 |
| 102 | 0.046 | 0.273 | −0.120 |
| 103 | 0.046 | 0.291 | −0.120 |
| 104 | 0.046 | 0.309 | −0.117 |
| 105 | 0.046 | 0.327 | −0.114 |
| 106 | 0.046 | 0.345 | −0.111 |
| 107 | 0.046 | 0.363 | −0.110 |
| 108 | 0.046 | 0.381 | −0.110 |
| 109 | 0.046 | 0.399 | −0.111 |
| 110 | 0.046 | 0.417 | −0.112 |
| 111 | 0.046 | 0.435 | −0.111 |
| 112 | 0.046 | 0.453 | −0.112 |
| 113 | 0.050 | 0.102 | −0.125 |
| 114 | 0.050 | 0.111 | −0.126 |
| 115 | 0.050 | 0.120 | −0.127 |
| 116 | 0.050 | 0.129 | −0.128 |
| 117 | 0.050 | 0.147 | −0.129 |
| 118 | 0.050 | 0.165 | −0.130 |
| 119 | 0.050 | 0.183 | −0.131 |
| 120 | 0.050 | 0.201 | −0.126 |
| 121 | 0.050 | 0.219 | −0.130 |
| 122 | 0.050 | 0.237 | −0.129 |
| 123 | 0.050 | 0.255 | −0.126 |
| 124 | 0.050 | 0.273 | −0.124 |
| 125 | 0.050 | 0.291 | −0.123 |
| 126 | 0.050 | 0.309 | −0.121 |
| 127 | 0.050 | 0.327 | −0.119 |
| 128 | 0.050 | 0.345 | −0.117 |
| 129 | 0.050 | 0.363 | −0.116 |
| 130 | 0.050 | 0.381 | −0.117 |
| 131 | 0.050 | 0.399 | −0.117 |
| 132 | 0.050 | 0.417 | −0.118 |
| 133 | 0.050 | 0.435 | −0.119 |
| 134 | 0.050 | 0.453 | −0.121 |
| 135 | 0.055 | 0.102 | −0.129 |
| 136 | 0.055 | 0.111 | −0.130 |
| 137 | 0.055 | 0.120 | −0.131 |
| 138 | 0.055 | 0.129 | −0.132 |
| 139 | 0.055 | 0.147 | −0.133 |
| 140 | 0.055 | 0.165 | −0.134 |
| 141 | 0.055 | 0.183 | −0.135 |
| 142 | 0.055 | 0.201 | −0.136 |
| 143 | 0.055 | 0.219 | −0.134 |
| 144 | 0.055 | 0.237 | −0.133 |
| 145 | 0.055 | 0.255 | −0.130 |
| 146 | 0.055 | 0.273 | −0.128 |
| 147 | 0.055 | 0.291 | −0.127 |
| 148 | 0.055 | 0.309 | −0.125 |
| 149 | 0.055 | 0.327 | −0.123 |
| 150 | 0.055 | 0.345 | −0.121 |
| 151 | 0.055 | 0.363 | −0.121 |
| 152 | 0.055 | 0.381 | −0.121 |
| 153 | 0.055 | 0.399 | −0.122 |
| 154 | 0.055 | 0.417 | −0.123 |
| 155 | 0.055 | 0.435 | −0.125 |
| 156 | 0.055 | 0.453 | −0.126 |
| 157 | 0.059 | 0.102 | −0.133 |
| 158 | 0.059 | 0.111 | −0.134 |
| 159 | 0.059 | 0.120 | −0.135 |
| 160 | 0.059 | 0.129 | −0.136 |
| 161 | 0.059 | 0.147 | −0.137 |
| 162 | 0.059 | 0.165 | −0.138 |
| 163 | 0.059 | 0.183 | −0.139 |
| 164 | 0.059 | 0.201 | −0.139 |
| 165 | 0.059 | 0.219 | −0.138 |
| 166 | 0.059 | 0.237 | −0.136 |
| 167 | 0.059 | 0.255 | −0.133 |
| 168 | 0.059 | 0.273 | −0.131 |
| 169 | 0.059 | 0.291 | −0.129 |
| 170 | 0.059 | 0.309 | −0.127 |
| 171 | 0.059 | 0.327 | −0.126 |
| 172 | 0.059 | 0.345 | −0.125 |
| 173 | 0.059 | 0.363 | −0.125 |
| 174 | 0.059 | 0.381 | −0.125 |
| 175 | 0.059 | 0.399 | −0.126 |

TABLE V-continued

Upstream Side Wing Radial Outer Surface Profile [non-dimensionalized values]

| PT | X | Y | Z |
|---|---|---|---|
| 176 | 0.059 | 0.417 | −0.127 |
| 177 | 0.059 | 0.435 | −0.129 |
| 178 | 0.059 | 0.453 | −0.130 |
| 179 | 0.077 | 0.102 | −0.146 |
| 180 | 0.077 | 0.111 | −0.147 |
| 181 | 0.077 | 0.120 | −0.148 |
| 182 | 0.077 | 0.129 | −0.149 |
| 183 | 0.077 | 0.147 | −0.150 |
| 184 | 0.077 | 0.165 | −0.151 |
| 185 | 0.077 | 0.183 | −0.151 |
| 186 | 0.077 | 0.201 | −0.150 |
| 187 | 0.077 | 0.219 | −0.147 |
| 188 | 0.077 | 0.237 | −0.145 |
| 189 | 0.077 | 0.255 | −0.142 |
| 190 | 0.077 | 0.273 | −0.140 |
| 191 | 0.077 | 0.291 | −0.138 |
| 192 | 0.077 | 0.309 | −0.136 |
| 193 | 0.077 | 0.327 | −0.135 |
| 194 | 0.077 | 0.345 | −0.135 |
| 195 | 0.077 | 0.363 | −0.135 |
| 196 | 0.077 | 0.381 | −0.135 |
| 197 | 0.077 | 0.399 | −0.136 |
| 198 | 0.077 | 0.417 | −0.137 |
| 199 | 0.077 | 0.435 | −0.138 |
| 200 | 0.077 | 0.453 | −0.139 |
| 201 | 0.095 | 0.093 | −0.157 |
| 202 | 0.095 | 0.102 | −0.157 |
| 203 | 0.095 | 0.111 | −0.158 |
| 204 | 0.095 | 0.120 | −0.158 |
| 205 | 0.095 | 0.129 | −0.159 |
| 206 | 0.095 | 0.147 | −0.159 |
| 207 | 0.095 | 0.165 | −0.159 |
| 208 | 0.095 | 0.183 | −0.158 |
| 209 | 0.095 | 0.201 | −0.157 |
| 210 | 0.095 | 0.219 | −0.154 |
| 211 | 0.095 | 0.237 | −0.151 |
| 212 | 0.095 | 0.255 | −0.149 |
| 213 | 0.095 | 0.273 | −0.147 |
| 214 | 0.095 | 0.291 | −0.144 |
| 215 | 0.095 | 0.309 | −0.143 |
| 216 | 0.095 | 0.327 | −0.142 |
| 217 | 0.095 | 0.345 | −0.142 |
| 218 | 0.095 | 0.363 | −0.142 |
| 219 | 0.095 | 0.381 | −0.143 |
| 220 | 0.095 | 0.399 | −0.143 |
| 221 | 0.095 | 0.417 | −0.144 |
| 222 | 0.095 | 0.435 | −0.144 |
| 223 | 0.095 | 0.453 | −0.145 |
| 224 | 0.113 | 0.084 | −0.168 |
| 225 | 0.113 | 0.093 | −0.167 |
| 226 | 0.113 | 0.102 | −0.167 |
| 227 | 0.113 | 0.111 | −0.167 |
| 228 | 0.113 | 0.120 | −0.167 |
| 229 | 0.113 | 0.129 | −0.167 |
| 230 | 0.113 | 0.147 | −0.167 |
| 231 | 0.113 | 0.165 | −0.166 |
| 232 | 0.113 | 0.183 | −0.164 |
| 233 | 0.113 | 0.201 | −0.162 |
| 234 | 0.113 | 0.219 | −0.159 |
| 235 | 0.113 | 0.237 | −0.157 |
| 236 | 0.113 | 0.255 | −0.154 |
| 237 | 0.113 | 0.273 | −0.152 |
| 238 | 0.113 | 0.291 | −0.150 |
| 239 | 0.113 | 0.309 | −0.149 |
| 240 | 0.113 | 0.327 | −0.148 |
| 241 | 0.113 | 0.345 | −0.149 |
| 242 | 0.113 | 0.363 | −0.150 |
| 243 | 0.113 | 0.381 | −0.150 |
| 244 | 0.113 | 0.399 | −0.151 |
| 245 | 0.113 | 0.417 | −0.151 |
| 246 | 0.113 | 0.435 | −0.152 |
| 247 | 0.113 | 0.453 | −0.151 |
| 248 | 0.131 | 0.075 | −0.178 |
| 249 | 0.131 | 0.084 | −0.177 |
| 250 | 0.131 | 0.093 | −0.176 |
| 251 | 0.131 | 0.102 | −0.175 |
| 252 | 0.131 | 0.111 | −0.175 |
| 253 | 0.131 | 0.120 | −0.175 |
| 254 | 0.131 | 0.129 | −0.174 |
| 255 | 0.131 | 0.147 | −0.173 |
| 256 | 0.131 | 0.165 | −0.172 |
| 257 | 0.131 | 0.183 | −0.169 |
| 258 | 0.131 | 0.201 | −0.167 |
| 259 | 0.131 | 0.219 | −0.164 |
| 260 | 0.131 | 0.237 | −0.162 |
| 261 | 0.131 | 0.255 | −0.160 |
| 262 | 0.131 | 0.273 | −0.158 |
| 263 | 0.131 | 0.291 | −0.157 |
| 264 | 0.131 | 0.309 | −0.156 |
| 265 | 0.131 | 0.327 | −0.156 |
| 266 | 0.131 | 0.345 | −0.157 |
| 267 | 0.131 | 0.363 | −0.157 |
| 268 | 0.131 | 0.381 | −0.159 |
| 269 | 0.131 | 0.399 | −0.160 |
| 270 | 0.131 | 0.417 | −0.159 |
| 271 | 0.131 | 0.435 | −0.158 |
| 272 | 0.149 | 0.066 | −0.185 |
| 273 | 0.149 | 0.075 | −0.184 |
| 274 | 0.149 | 0.084 | −0.183 |
| 275 | 0.149 | 0.093 | −0.183 |
| 276 | 0.149 | 0.102 | −0.182 |
| 277 | 0.149 | 0.111 | −0.182 |
| 278 | 0.149 | 0.120 | −0.181 |
| 279 | 0.149 | 0.129 | −0.180 |
| 280 | 0.149 | 0.147 | −0.179 |
| 281 | 0.149 | 0.165 | −0.177 |
| 282 | 0.149 | 0.183 | −0.174 |
| 283 | 0.149 | 0.201 | −0.171 |
| 284 | 0.149 | 0.219 | −0.169 |
| 285 | 0.149 | 0.237 | −0.167 |
| 286 | 0.149 | 0.255 | −0.165 |
| 287 | 0.149 | 0.273 | −0.164 |
| 288 | 0.149 | 0.291 | −0.164 |
| 289 | 0.149 | 0.309 | −0.164 |
| 290 | 0.149 | 0.327 | −0.165 |
| 291 | 0.149 | 0.345 | −0.165 |
| 292 | 0.149 | 0.363 | −0.166 |
| 293 | 0.149 | 0.381 | −0.167 |
| 294 | 0.149 | 0.399 | −0.166 |
| 295 | 0.167 | 0.075 | −0.190 |
| 296 | 0.167 | 0.093 | −0.189 |
| 297 | 0.167 | 0.111 | −0.188 |
| 298 | 0.167 | 0.129 | −0.187 |
| 299 | 0.167 | 0.147 | −0.185 |
| 300 | 0.167 | 0.165 | −0.182 |
| 301 | 0.167 | 0.183 | −0.179 |
| 302 | 0.167 | 0.201 | −0.177 |
| 303 | 0.167 | 0.219 | −0.174 |
| 304 | 0.167 | 0.237 | −0.173 |
| 305 | 0.167 | 0.255 | −0.172 |
| 306 | 0.167 | 0.273 | −0.171 |
| 307 | 0.167 | 0.291 | −0.171 |
| 308 | 0.167 | 0.309 | −0.172 |
| 309 | 0.167 | 0.327 | −0.173 |
| 310 | 0.167 | 0.345 | −0.174 |
| 311 | 0.167 | 0.363 | −0.174 |
| 312 | 0.167 | 0.381 | −0.173 |
| 313 | 0.185 | 0.093 | −0.195 |
| 314 | 0.185 | 0.111 | −0.194 |
| 315 | 0.185 | 0.129 | −0.193 |
| 316 | 0.185 | 0.147 | −0.191 |
| 317 | 0.185 | 0.165 | −0.187 |
| 318 | 0.185 | 0.183 | −0.184 |
| 319 | 0.185 | 0.201 | −0.182 |
| 320 | 0.185 | 0.219 | −0.180 |
| 321 | 0.185 | 0.237 | −0.179 |
| 322 | 0.185 | 0.255 | −0.179 |
| 323 | 0.185 | 0.273 | −0.179 |
| 324 | 0.185 | 0.291 | −0.179 |
| 325 | 0.185 | 0.309 | −0.180 |

TABLE V-continued

Upstream Side Wing Radial Outer Surface Profile
[non-dimensionalized values]

| PT | X | Y | Z |
|---|---|---|---|
| 326 | 0.185 | 0.327 | −0.181 |
| 327 | 0.185 | 0.345 | −0.181 |
| 328 | 0.185 | 0.363 | −0.180 |
| 329 | 0.203 | 0.093 | −0.201 |
| 330 | 0.203 | 0.111 | −0.200 |
| 331 | 0.203 | 0.129 | −0.198 |
| 332 | 0.203 | 0.147 | −0.196 |
| 333 | 0.203 | 0.165 | −0.193 |
| 334 | 0.203 | 0.183 | −0.190 |
| 335 | 0.203 | 0.201 | −0.188 |
| 336 | 0.203 | 0.219 | −0.187 |
| 337 | 0.203 | 0.237 | −0.186 |
| 338 | 0.203 | 0.255 | −0.186 |
| 339 | 0.203 | 0.273 | −0.187 |
| 340 | 0.203 | 0.291 | −0.187 |
| 341 | 0.203 | 0.309 | −0.188 |
| 342 | 0.203 | 0.327 | −0.188 |
| 343 | 0.203 | 0.345 | −0.187 |
| 344 | 0.221 | 0.093 | −0.208 |
| 345 | 0.221 | 0.111 | −0.206 |
| 346 | 0.221 | 0.129 | −0.204 |
| 347 | 0.221 | 0.147 | −0.202 |
| 348 | 0.221 | 0.165 | −0.198 |
| 349 | 0.221 | 0.183 | −0.196 |
| 350 | 0.221 | 0.201 | −0.195 |
| 351 | 0.221 | 0.219 | −0.194 |
| 352 | 0.221 | 0.237 | −0.194 |
| 353 | 0.221 | 0.255 | −0.194 |
| 354 | 0.221 | 0.273 | −0.195 |
| 355 | 0.221 | 0.291 | −0.195 |
| 356 | 0.221 | 0.309 | −0.195 |
| 357 | 0.221 | 0.327 | −0.194 |
| 358 | 0.239 | 0.111 | −0.213 |
| 359 | 0.239 | 0.129 | −0.210 |
| 360 | 0.239 | 0.147 | −0.207 |
| 361 | 0.239 | 0.165 | −0.204 |
| 362 | 0.239 | 0.183 | −0.202 |
| 363 | 0.239 | 0.201 | −0.201 |
| 364 | 0.239 | 0.219 | −0.201 |
| 365 | 0.239 | 0.237 | −0.201 |
| 366 | 0.239 | 0.255 | −0.202 |
| 367 | 0.239 | 0.273 | −0.202 |
| 368 | 0.239 | 0.291 | −0.202 |
| 369 | 0.239 | 0.309 | −0.201 |
| 370 | 0.257 | 0.111 | −0.219 |
| 371 | 0.257 | 0.129 | −0.216 |
| 372 | 0.257 | 0.147 | −0.213 |
| 373 | 0.257 | 0.165 | −0.211 |
| 374 | 0.257 | 0.183 | −0.209 |
| 375 | 0.257 | 0.201 | −0.209 |
| 376 | 0.257 | 0.219 | −0.209 |
| 377 | 0.257 | 0.237 | −0.209 |
| 378 | 0.257 | 0.255 | −0.209 |
| 379 | 0.257 | 0.273 | −0.209 |
| 380 | 0.257 | 0.291 | −0.208 |
| 381 | 0.275 | 0.111 | −0.225 |
| 382 | 0.275 | 0.129 | −0.223 |
| 383 | 0.275 | 0.147 | −0.220 |
| 384 | 0.275 | 0.165 | −0.217 |
| 385 | 0.275 | 0.183 | −0.216 |
| 386 | 0.275 | 0.201 | −0.216 |
| 387 | 0.275 | 0.219 | −0.216 |
| 388 | 0.275 | 0.237 | −0.216 |
| 389 | 0.275 | 0.255 | −0.216 |
| 390 | 0.275 | 0.273 | −0.215 |
| 391 | 0.293 | 0.111 | −0.231 |
| 392 | 0.293 | 0.129 | −0.230 |
| 393 | 0.293 | 0.147 | −0.226 |
| 394 | 0.293 | 0.165 | −0.224 |
| 395 | 0.293 | 0.183 | −0.223 |
| 396 | 0.293 | 0.201 | −0.223 |
| 397 | 0.293 | 0.219 | −0.223 |
| 398 | 0.293 | 0.237 | −0.223 |
| 399 | 0.293 | 0.237 | −0.223 |
| 400 | 0.293 | 0.255 | −0.222 |
| 401 | 0.311 | 0.129 | −0.236 |
| 402 | 0.311 | 0.147 | −0.233 |
| 403 | 0.311 | 0.165 | −0.231 |
| 404 | 0.311 | 0.183 | −0.230 |
| 405 | 0.311 | 0.201 | −0.230 |
| 406 | 0.311 | 0.219 | −0.230 |
| 407 | 0.311 | 0.237 | −0.230 |
| 408 | 0.329 | 0.129 | −0.242 |
| 409 | 0.329 | 0.147 | −0.240 |
| 410 | 0.329 | 0.165 | −0.238 |
| 411 | 0.329 | 0.183 | −0.237 |
| 412 | 0.329 | 0.201 | −0.237 |
| 413 | 0.329 | 0.219 | −0.237 |
| 414 | 0.347 | 0.129 | −0.249 |
| 415 | 0.347 | 0.147 | −0.247 |
| 416 | 0.347 | 0.165 | −0.245 |
| 417 | 0.347 | 0.183 | −0.244 |
| 418 | 0.347 | 0.201 | −0.244 |
| 419 | 0.365 | 0.147 | −0.254 |
| 420 | 0.365 | 0.165 | −0.252 |
| 421 | 0.365 | 0.183 | −0.251 |

A radially outer surface 240 of wing 234 on the downstream side of tip rail 220 may have a shape having a nominal profile substantially in accordance with at least part of Cartesian coordinate values of X, Y, Z set forth in TABLE VI (below) and originating at rearward-most and radially outermost origin 262. The Cartesian coordinate values are non-dimensional values of from 0% to 100% convertible to distances by multiplying the values by a tip rail axial length $L_{TR}$. That is, the normalization parameter for the X, Y and Z coordinates are the same, tip rail axial length ($L_{TR}$) of tip rail 250. When scaling up or down, the X, Y, Z coordinate values in TABLE VI can be multiplied by the actual, desired tip rail axial length ($L_{TR}$) of tip rail 250 to identify the corresponding actual X, Y, Z coordinate values of the downstream side radial outer surface 240 profile. The actual X, Y and Z coordinate values can be joined smoothly with one another to form the downstream side radial outer surface 240 profile.

TABLE VI

Downstream Side Radial Outer Surface Profile
[non-dimensionalized values]

| PT | X | Y | Z |
|---|---|---|---|
| 1 | −0.023 | −0.040 | −0.086 |
| 2 | −0.023 | −0.049 | −0.087 |
| 3 | −0.023 | −0.058 | −0.088 |
| 4 | −0.023 | −0.067 | −0.088 |
| 5 | −0.023 | −0.076 | −0.089 |
| 6 | −0.023 | −0.085 | −0.090 |
| 7 | −0.023 | −0.094 | −0.091 |
| 8 | −0.023 | −0.103 | −0.091 |
| 9 | −0.023 | −0.112 | −0.092 |
| 10 | −0.023 | −0.121 | −0.093 |
| 11 | −0.023 | −0.130 | −0.094 |
| 12 | −0.023 | −0.148 | −0.097 |
| 13 | −0.023 | −0.166 | −0.099 |
| 14 | −0.023 | −0.184 | −0.100 |
| 15 | −0.023 | −0.202 | −0.100 |
| 16 | −0.028 | −0.049 | −0.102 |
| 17 | −0.028 | −0.058 | −0.101 |
| 18 | −0.028 | −0.067 | −0.101 |
| 19 | −0.028 | −0.076 | −0.101 |
| 20 | −0.028 | −0.085 | −0.101 |
| 21 | −0.028 | −0.094 | −0.101 |

TABLE VI-continued

Downstream Side Radial Outer Surface Profile
[non-dimensionalized values]

| PT | X | Y | Z |
|---|---|---|---|
| 22 | −0.028 | −0.103 | −0.102 |
| 23 | −0.028 | −0.112 | −0.103 |
| 24 | −0.028 | −0.121 | −0.105 |
| 25 | −0.028 | −0.130 | −0.106 |
| 26 | −0.028 | −0.148 | −0.109 |
| 27 | −0.028 | −0.166 | −0.111 |
| 28 | −0.028 | −0.184 | −0.114 |
| 29 | −0.028 | −0.202 | −0.114 |
| 30 | −0.028 | −0.220 | −0.112 |
| 31 | −0.028 | −0.238 | −0.111 |
| 32 | −0.028 | −0.256 | −0.109 |
| 33 | −0.028 | −0.274 | −0.106 |
| 34 | −0.028 | −0.292 | −0.100 |
| 35 | −0.032 | −0.067 | −0.105 |
| 36 | −0.032 | −0.094 | −0.105 |
| 37 | −0.032 | −0.103 | −0.106 |
| 38 | −0.032 | −0.112 | −0.107 |
| 39 | −0.032 | −0.121 | −0.109 |
| 40 | −0.032 | −0.130 | −0.110 |
| 41 | −0.032 | −0.148 | −0.113 |
| 42 | −0.032 | −0.166 | −0.116 |
| 43 | −0.032 | −0.202 | −0.119 |
| 44 | −0.032 | −0.220 | −0.119 |
| 45 | −0.032 | −0.238 | −0.118 |
| 46 | −0.032 | −0.256 | −0.117 |
| 47 | −0.032 | −0.274 | −0.116 |
| 48 | −0.032 | −0.292 | −0.115 |
| 49 | −0.032 | −0.310 | −0.114 |
| 50 | −0.032 | −0.364 | −0.109 |
| 51 | −0.032 | −0.382 | −0.107 |
| 52 | −0.032 | −0.400 | −0.103 |
| 53 | −0.032 | −0.058 | −0.106 |
| 54 | −0.032 | −0.076 | −0.105 |
| 55 | −0.032 | −0.085 | −0.105 |
| 56 | −0.032 | −0.184 | −0.119 |
| 57 | −0.032 | −0.328 | −0.112 |
| 58 | −0.032 | −0.346 | −0.111 |
| 59 | −0.037 | −0.067 | −0.109 |
| 60 | −0.037 | −0.076 | −0.108 |
| 61 | −0.037 | −0.085 | −0.108 |
| 62 | −0.037 | −0.094 | −0.108 |
| 63 | −0.037 | −0.103 | −0.108 |
| 64 | −0.037 | −0.112 | −0.110 |
| 65 | −0.037 | −0.121 | −0.111 |
| 66 | −0.037 | −0.130 | −0.113 |
| 67 | −0.037 | −0.148 | −0.116 |
| 68 | −0.037 | −0.166 | −0.119 |
| 69 | −0.037 | −0.184 | −0.121 |
| 70 | −0.037 | −0.202 | −0.122 |
| 71 | −0.037 | −0.220 | −0.122 |
| 72 | −0.037 | −0.238 | −0.122 |
| 73 | −0.037 | −0.256 | −0.121 |
| 74 | −0.037 | −0.274 | −0.121 |
| 75 | −0.037 | −0.292 | −0.119 |
| 76 | −0.037 | −0.310 | −0.118 |
| 77 | −0.037 | −0.328 | −0.117 |
| 78 | −0.037 | −0.346 | −0.117 |
| 79 | −0.037 | −0.364 | −0.117 |
| 80 | −0.037 | −0.382 | −0.117 |
| 81 | −0.037 | −0.400 | −0.116 |
| 82 | −0.037 | −0.418 | −0.115 |
| 83 | −0.037 | −0.436 | −0.114 |
| 84 | −0.037 | −0.454 | −0.113 |
| 85 | −0.041 | −0.076 | −0.110 |
| 86 | −0.041 | −0.085 | −0.110 |
| 87 | −0.041 | −0.094 | −0.110 |
| 88 | −0.041 | −0.103 | −0.111 |
| 89 | −0.041 | −0.112 | −0.112 |
| 90 | −0.041 | −0.121 | −0.113 |
| 91 | −0.041 | −0.130 | −0.115 |
| 92 | −0.041 | −0.148 | −0.117 |
| 93 | −0.041 | −0.166 | −0.120 |
| 94 | −0.041 | −0.184 | −0.122 |
| 95 | −0.041 | −0.202 | −0.124 |
| 96 | −0.041 | −0.220 | −0.124 |
| 97 | −0.041 | −0.238 | −0.124 |
| 98 | −0.041 | −0.256 | −0.124 |
| 99 | −0.041 | −0.274 | −0.123 |
| 100 | −0.041 | −0.292 | −0.122 |
| 101 | −0.041 | −0.310 | −0.120 |
| 102 | −0.041 | −0.328 | −0.120 |
| 103 | −0.041 | −0.346 | −0.120 |
| 104 | −0.041 | −0.364 | −0.121 |
| 105 | −0.041 | −0.382 | −0.121 |
| 106 | −0.041 | −0.400 | −0.121 |
| 107 | −0.041 | −0.418 | −0.121 |
| 108 | −0.041 | −0.436 | −0.120 |
| 109 | −0.041 | −0.454 | −0.120 |
| 110 | −0.046 | −0.085 | −0.112 |
| 111 | −0.046 | −0.094 | −0.112 |
| 112 | −0.046 | −0.103 | −0.112 |
| 113 | −0.046 | −0.112 | −0.113 |
| 114 | −0.046 | −0.121 | −0.115 |
| 115 | −0.046 | −0.130 | −0.116 |
| 116 | −0.046 | −0.148 | −0.118 |
| 117 | −0.046 | −0.166 | −0.121 |
| 118 | −0.046 | −0.184 | −0.123 |
| 119 | −0.046 | −0.202 | −0.124 |
| 120 | −0.046 | −0.220 | −0.125 |
| 121 | −0.046 | −0.238 | −0.125 |
| 122 | −0.046 | −0.256 | −0.125 |
| 123 | −0.046 | −0.274 | −0.124 |
| 124 | −0.046 | −0.292 | −0.123 |
| 125 | −0.046 | −0.310 | −0.122 |
| 126 | −0.046 | −0.328 | −0.121 |
| 127 | −0.046 | −0.346 | −0.122 |
| 128 | −0.046 | −0.364 | −0.123 |
| 129 | −0.046 | −0.382 | −0.124 |
| 130 | −0.046 | −0.400 | −0.124 |
| 131 | −0.046 | −0.418 | −0.124 |
| 132 | −0.046 | −0.436 | −0.124 |
| 133 | −0.046 | −0.454 | −0.124 |
| 134 | −0.050 | −0.085 | −0.113 |
| 135 | −0.050 | −0.094 | −0.113 |
| 136 | −0.050 | −0.103 | −0.114 |
| 137 | −0.050 | −0.112 | −0.115 |
| 138 | −0.050 | −0.121 | −0.116 |
| 139 | −0.050 | −0.130 | −0.117 |
| 140 | −0.050 | −0.148 | −0.119 |
| 141 | −0.050 | −0.166 | −0.121 |
| 142 | −0.050 | −0.184 | −0.123 |
| 143 | −0.050 | −0.202 | −0.124 |
| 144 | −0.050 | −0.220 | −0.125 |
| 145 | −0.050 | −0.238 | −0.126 |
| 146 | −0.050 | −0.256 | −0.125 |
| 147 | −0.050 | −0.274 | −0.125 |
| 148 | −0.050 | −0.292 | −0.123 |
| 149 | −0.050 | −0.310 | −0.122 |
| 150 | −0.050 | −0.328 | −0.122 |
| 151 | −0.050 | −0.346 | −0.123 |
| 152 | −0.050 | −0.364 | −0.124 |
| 153 | −0.050 | −0.382 | −0.125 |
| 154 | −0.050 | −0.400 | −0.125 |
| 155 | −0.050 | −0.418 | −0.125 |
| 156 | −0.050 | −0.436 | −0.126 |
| 157 | −0.050 | −0.454 | −0.126 |
| 158 | −0.055 | −0.094 | −0.114 |
| 159 | −0.055 | −0.103 | −0.115 |
| 160 | −0.055 | −0.112 | −0.116 |
| 161 | −0.055 | −0.121 | −0.117 |
| 162 | −0.055 | −0.130 | −0.117 |
| 163 | −0.055 | −0.148 | −0.119 |
| 164 | −0.055 | −0.166 | −0.121 |
| 165 | −0.055 | −0.184 | −0.122 |
| 166 | −0.055 | −0.202 | −0.124 |
| 167 | −0.055 | −0.220 | −0.125 |
| 168 | −0.055 | −0.238 | −0.125 |
| 169 | −0.055 | −0.256 | −0.125 |
| 170 | −0.055 | −0.274 | −0.124 |
| 171 | −0.055 | −0.292 | −0.123 |

TABLE VI-continued

Downstream Side Radial Outer Surface Profile
[non-dimensionalized values]

| PT | X | Y | Z |
| --- | --- | --- | --- |
| 172 | −0.055 | −0.310 | −0.122 |
| 173 | −0.055 | −0.328 | −0.122 |
| 174 | −0.055 | −0.346 | −0.123 |
| 175 | −0.055 | −0.364 | −0.124 |
| 176 | −0.055 | −0.382 | −0.125 |
| 177 | −0.055 | −0.400 | −0.126 |
| 178 | −0.055 | −0.418 | −0.126 |
| 179 | −0.055 | −0.436 | −0.127 |
| 180 | −0.055 | −0.454 | −0.128 |
| 181 | −0.059 | −0.103 | −0.116 |
| 182 | −0.059 | −0.112 | −0.116 |
| 183 | −0.059 | −0.121 | −0.117 |
| 184 | −0.059 | −0.130 | −0.118 |
| 185 | −0.059 | −0.148 | −0.119 |
| 186 | −0.059 | −0.166 | −0.120 |
| 187 | −0.059 | −0.184 | −0.122 |
| 188 | −0.059 | −0.202 | −0.123 |
| 189 | −0.059 | −0.220 | −0.124 |
| 190 | −0.059 | −0.238 | −0.125 |
| 191 | −0.059 | −0.256 | −0.125 |
| 192 | −0.059 | −0.274 | −0.124 |
| 193 | −0.059 | −0.292 | −0.123 |
| 194 | −0.059 | −0.310 | −0.122 |
| 195 | −0.059 | −0.328 | −0.122 |
| 196 | −0.059 | −0.346 | −0.123 |
| 197 | −0.059 | −0.364 | −0.124 |
| 198 | −0.059 | −0.382 | −0.125 |
| 199 | −0.059 | −0.400 | −0.126 |
| 200 | −0.059 | −0.418 | −0.127 |
| 201 | −0.059 | −0.436 | −0.128 |
| 202 | −0.059 | −0.454 | −0.128 |
| 203 | −0.077 | −0.121 | −0.117 |
| 204 | −0.077 | −0.130 | −0.117 |
| 205 | −0.077 | −0.148 | −0.117 |
| 206 | −0.077 | −0.166 | −0.117 |
| 207 | −0.077 | −0.184 | −0.118 |
| 208 | −0.077 | −0.202 | −0.119 |
| 209 | −0.077 | −0.220 | −0.120 |
| 210 | −0.077 | −0.238 | −0.120 |
| 211 | −0.077 | −0.256 | −0.120 |
| 212 | −0.077 | −0.274 | −0.120 |
| 213 | −0.077 | −0.292 | −0.119 |
| 214 | −0.077 | −0.310 | −0.119 |
| 215 | −0.077 | −0.328 | −0.120 |
| 216 | −0.077 | −0.346 | −0.120 |
| 217 | −0.077 | −0.364 | −0.120 |
| 218 | −0.077 | −0.382 | −0.120 |
| 219 | −0.077 | −0.400 | −0.122 |
| 220 | −0.077 | −0.418 | −0.123 |
| 221 | −0.077 | −0.436 | −0.124 |
| 222 | −0.077 | −0.454 | −0.125 |
| 223 | −0.095 | −0.121 | −0.113 |
| 224 | −0.095 | −0.130 | −0.113 |
| 225 | −0.095 | −0.148 | −0.112 |
| 226 | −0.095 | −0.166 | −0.112 |
| 227 | −0.095 | −0.184 | −0.113 |
| 228 | −0.095 | −0.202 | −0.113 |
| 229 | −0.095 | −0.220 | −0.113 |
| 230 | −0.095 | −0.238 | −0.113 |
| 231 | −0.095 | −0.256 | −0.113 |
| 232 | −0.095 | −0.274 | −0.114 |
| 233 | −0.095 | −0.292 | −0.114 |
| 234 | −0.095 | −0.310 | −0.114 |
| 235 | −0.095 | −0.328 | −0.115 |
| 236 | −0.095 | −0.346 | −0.115 |
| 237 | −0.095 | −0.364 | −0.115 |
| 238 | −0.095 | −0.382 | −0.115 |
| 239 | −0.095 | −0.400 | −0.116 |
| 240 | −0.095 | −0.418 | −0.117 |
| 241 | −0.095 | −0.436 | −0.118 |
| 242 | −0.095 | −0.454 | −0.118 |

In another embodiment, tip shroud 220 may also include both downstream side radial outer radial surface 240 profile and upstream side radial outer surface 236 profile.

Other embodiments of the disclosure may include any combination of surface profiles described herein.

The disclosed surface profiles provide unique shapes to achieve, for example: 1) improved interaction between other stages in turbine 108 (FIG. 1); 2) aerodynamic efficiency; and 3) normalized aerodynamic and mechanical blade or tip shroud loadings. The disclosed loci of points defined in TABLE I-VI allow GT system 100 or any other suitable turbine system to run in an efficient, safe and smooth manner. As also noted, any scale of tip shroud 220 may be adopted as long as: 1) interaction between other stages in the pressure of turbine 108 (FIG. 1); 2) aerodynamic efficiency; and 3) normalized aerodynamic and mechanical blade or airfoil loadings, are maintained in the scaled turbine.

Tip shroud 220 surface profile(s) described herein thus improves overall GT system 100 efficiency. Specifically, tip shroud 220 surface profile(s) provide a desired turbine efficiency lapse rate (hot, cold, part load, etc.). Tip shroud 220 surface profile(s) also meet all aeromechanical and stress requirements. Turbine blades including tip shrouds 220, described herein, have very specific aerodynamic requirements. Significant cross-functional effort was required to meet these goals. Tip shroud 220 surface profile(s) of turbine blade 200 thus possess a specific shapes to meet aerodynamic, mechanical, and heat transfer requirements in an efficient and cost effective manner.

The apparatus and devices of the present disclosure are not limited to any one particular turbomachine, engine, turbine, jet engine, power generation system or other system, and may be used with turbomachines such as aircraft systems, power generation systems (e.g., simple cycle, combined cycle), and/or other systems (e.g., nuclear reactor). Additionally, the apparatus of the present disclosure may be used with other systems not described herein that may benefit from the increased efficiency of the apparatus and devices described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

We claim:

1. A turbine blade tip shroud, comprising:
    a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side;
    a tip rail extending radially from the pair of opposed, axially extending wings, the tip rail having a downstream side, an upstream side opposing the downstream side, and a forward-most and radially outermost origin, and
    wherein the upstream side of the tip rail has a shape having a nominal profile substantially in accordance with at least part of Cartesian coordinate values of X, Y set forth in TABLE I and originating at the forward-most and radially outermost origin, wherein the Cartesian coordinate values are non-dimensional values of from 0% to 100% convertible to distances by multiplying the X values by a minimum X-wise extent of the tip rail expressed in units of distance and the Y values by a tip rail axial length expressed in units of distance, and wherein X and Y values are connected by lines to define a tip rail upstream side surface profile.

2. The turbine blade tip shroud of claim 1, wherein the turbine blade includes a fourth stage blade.

3. The turbine blade tip shroud of claim 1, wherein the downstream side of the tip rail has a shape having a nominal profile substantially in accordance with at least part of Cartesian coordinate values of X, Y set forth in TABLE II and originating at the forward-most and radially outermost origin, wherein the Cartesian coordinate values are non-dimensional values of from 0% to 100% convertible to distances by multiplying the X values by the minimum X-wise extent of the tip rail expressed in units of distance and the Y values by the tip rail axial length expressed in units of distance, and wherein X and Y values are connected by lines to define a tip rail downstream side surface profile.

4. A turbine blade tip shroud, comprising:
    a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side;
    a tip rail extending radially from the pair of opposed, axially extending wings, the tip rail having a downstream side, an upstream side opposing the downstream side and a forward-most and radially outermost origin, and
    wherein the downstream side of the tip rail has a shape having a nominal profile substantially in accordance with at least part of Cartesian coordinate values of X, Y set forth in TABLE II and originating at the forward-most and radially outermost origin, wherein the Cartesian coordinate values are non-dimensional values of from 0% to 100% convertible to distances by multiplying the X values by a minimum X-wise extent of the tip rail expressed in units of distance and the Y values by a tip rail axial length expressed in units of distance, and wherein X and Y values are connected by lines to define a tip rail downstream side surface profile.

5. The turbine blade tip shroud of claim 4, wherein the turbine blade includes a fourth stage blade.

6. The turbine blade tip shroud of claim 5, wherein the upstream side of the tip rail has a shape having a nominal profile substantially in accordance with at least part of Cartesian coordinate values of X, Y set forth in TABLE I and originating at the forward-most and radially outermost origin, wherein the Cartesian coordinate values are non-dimensional values of from 0% to 100% convertible to distances by multiplying the X values by the minimum X-wise extent of the tip rail expressed in units of distance and the Y values by the tip rail axial length expressed in units of distance, and wherein X and Y values are connected by lines to define a tip rail upstream side surface profile.

7. A turbine blade tip shroud, comprising:
    a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side;
    a tip rail extending radially from the pair of opposed, axially extending wings, the tip rail having a downstream side and an upstream side opposing the downstream side and a forward-most and radially outermost origin; and
    a leading Z-notch surface having a shape having a nominal profile substantially in accordance with at least part of Cartesian coordinate values of X, Y, Z and thickness values set forth in TABLE III and originating at the forward-most and radially outermost origin, wherein the Cartesian coordinate values are non-dimensional values of from 0% to 100% convertible to distances by multiplying the values by a tip rail axial length, and wherein X and Y values are joined smoothly with one another to form a leading Z-notch surface profile,
    wherein the thickness of the leading Z-notch surface profile at each X and Y coordinate value extends radially inwardly from a corresponding Z value.

8. The turbine blade tip shroud of claim 7, wherein the turbine blade includes a fourth stage blade.

9. The turbine blade tip shroud of claim 7, further comprising a trailing Z-notch surface having a shape having a nominal profile substantially in accordance with at least part of Cartesian coordinate values of X, Y, Z and thickness values set forth in TABLE IV and originating at the forward-most and radially outermost origin, wherein the Cartesian coordinate values are non-dimensional values of from 0% to 100% convertible to distances by multiplying the values by the tip rail axial length, and wherein X and Y values are joined smoothly with one another to form a trailing Z-notch surface profile,
    wherein the thickness of the trailing Z-notch surface profile at each X and Y coordinate value extends radially inwardly from a corresponding Z value.

10. A turbine blade tip shroud, comprising:
    a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side;
    a tip rail extending radially from the pair of opposed, axially extending wings, the tip rail having a downstream side and an upstream side opposing the downstream side and a forward-most and radially outermost origin; and a trailing Z-notch surface having a shape having a nominal profile substantially in accordance with at least part of Cartesian coordinate values of X, Y, Z and thickness values set forth in TABLE IV and originating at the forward-most and radially outermost origin, wherein the Cartesian coordinate values are non-dimensional values of from 0% to 100% convertible to distances by multiplying the values by a tip rail axial length, and wherein X and Y values are joined smoothly with one another to form a trailing Z-notch surface profile, wherein the thickness of the trailing Z-notch surface profile at each X and Y coordinate value extends radially inwardly from a corresponding Z value.

11. The turbine blade tip shroud of claim 10, wherein the turbine blade includes a fourth stage blade.

12. The turbine blade tip shroud of claim 11, further comprising a leading Z-notch surface having a shape having a nominal profile substantially in accordance with at least part of Cartesian coordinate values of X, Y, Z and thickness values set forth in TABLE III and originating at the forward-most and radially outermost origin, wherein the Cartesian coordinate values are non-dimensional values of from 0% to 100% convertible to distances by multiplying the values by a tip rail axial length, and wherein X and Y values are joined smoothly with one another to form a leading Z-notch surface profile, wherein the thickness of the leading Z-notch surface profile at each X and Y coordinate value extends radially inwardly from a corresponding Z value.

13. A turbine blade tip shroud, comprising:

a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side;

a tip rail extending radially from the pair of opposed, axially extending wings, the tip rail having a downstream side and an upstream side opposing the downstream side, the tip rail having a forward-most and radially outermost origin; and a radially outer surface of the wing on the downstream side of the tip rail having a shape having a nominal profile substantially in accordance with at least part of Cartesian coordinate values of X, Y, Z set forth in TABLE V and originating at the forward-most and radially outermost origin, wherein the Cartesian coordinate values are non-dimensional values of from 0% to 100% convertible to distances by multiplying the values by a tip rail axial length, and wherein X, Y and Z values are joined smoothly with one another to form a downstream side radial outer surface profile.

14. The turbine blade tip shroud of claim 13, wherein the turbine blade includes a fourth stage blade.

15. The turbine blade tip shroud of claim 13, further comprising a radially outer surface of the wing on the upstream side of the tip rail having a shape having a nominal profile substantially in accordance with at least part of Cartesian coordinate values of X, Y, Z set forth in TABLE VI and originating at the rearward-most and radially outermost origin, wherein the Cartesian coordinate values are non-dimensional values of from 0% to 100% convertible to distances by multiplying the values by a tip rail axial length, and wherein X, Y and Z values are joined smoothly with one another to form an upstream side radial outer surface profile.

16. A turbine blade tip shroud, comprising:

a pair of opposed, axially extending wings configured to couple to an airfoil at a radially outer end of the airfoil, the airfoil having a suction side and a pressure side opposing the suction side, a leading edge spanning between the pressure side and the suction side, and a trailing edge opposing the leading edge and spanning between the pressure side and the suction side;

a tip rail extending radially from the pair of opposed, axially extending wings, the tip rail having a downstream side and an upstream side opposing the downstream side, the tip rail having a rearward-most and radially outermost origin; and a radially outer surface of the wing on the upstream side of the tip rail having a shape having a nominal profile substantially in accordance with at least part of Cartesian coordinate values of X, Y, Z set forth in TABLE VI and originating at the rearward-most and radially outermost origin, wherein the Cartesian coordinate values are non-dimensional values of from 0% to 100% convertible to distances by multiplying the values by a tip rail axial length, and wherein X, Y and Z values are joined smoothly with one another to form an upstream side radial outer surface profile.

17. The turbine blade tip shroud of claim 16, wherein the turbine blade includes a fourth stage blade.

18. The turbine blade tip shroud of claim 17, further comprising a radially outer surface of the wing on the downstream side of the tip rail having a shape having a nominal profile substantially in accordance with at least part of Cartesian coordinate values of X, Y, Z set forth in TABLE V and originating at the forward-most and radially outermost origin, wherein the Cartesian coordinate values are non-dimensional values of from 0% to 100% convertible to distances by multiplying the values by a tip rail axial length, and wherein X, Y and Z values are joined smoothly with one another to form a downstream side radial outer surface profile.

* * * * *